(12) United States Patent
Crystal et al.

(10) Patent No.: US 8,738,763 B2
(45) Date of Patent: May 27, 2014

(54) RESEARCH DATA GATHERING WITH A PORTABLE MONITOR AND A STATIONARY DEVICE

(75) Inventors: Jack C. Crystal, Owings Mills, MD (US); James M. Jensen, Shelton, WA (US); William K. Krug, Rockville, MD (US); Wendell D. Lynch, East Lansing, MI (US); Alan R. Neuhauser, Silver Springs, MD (US); Eugene L. Flanagan, III, Wilton, CT (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 11/935,788

(22) Filed: Nov. 6, 2007

(65) Prior Publication Data

US 2009/0037575 A1 Feb. 5, 2009

Related U.S. Application Data

(63) Continuation-in-part of application No. 10/811,174, filed on Mar. 26, 2004, now Pat. No. 7,483,975.

(60) Provisional application No. 60/857,714, filed on Nov. 7, 2006.

(51) Int. Cl.
*G06F 15/173* (2006.01)

(52) U.S. Cl.
USPC .......................................... 709/224; 709/201

(58) Field of Classification Search
USPC ........................................................ 709/201
See application file for complete search history.

(56) References Cited

U.S. PATENT DOCUMENTS

| | | | |
|---|---|---|---|
| 4,695,879 A | | 9/1987 | Weinblatt |
| 4,930,011 A | * | 5/1990 | Kiewit .............................. 725/10 |
| 5,481,294 A | * | 1/1996 | Thomas et al. .................. 725/20 |
| 5,483,276 A | | 1/1996 | Brooks et al. |
| 5,497,185 A | | 3/1996 | Dufresne et al. |
| 5,550,928 A | | 8/1996 | Lu et al. |
| 5,737,026 A | | 4/1998 | Lu et al. |

(Continued)

FOREIGN PATENT DOCUMENTS

| | | |
|---|---|---|
| AU | 2003253598 | 11/2003 |
| EP | 0231427 | 8/1986 |

(Continued)

OTHER PUBLICATIONS

Apr. 22, 2009 Complaint in *Arbitron Inc.*, v. *John Barrett Kiefl* in United States District Court for the Southern District of New York. Case 1:09-cv-04013-PAC.

(Continued)

*Primary Examiner* — Noel Beharry
*Assistant Examiner* — Farhad Ali
(74) *Attorney, Agent, or Firm* — Hanley, Flight & Zimmerman, LLC

(57) ABSTRACT

Methods of gathering data concerning a location of an audience member proximate to a content presentation are provided. A stationary device is proximate to the content presentation. A portable monitor is carried by or with the person of an audience member. Location data is obtained by communicating data from the portable monitor to the stationary device, or from the stationary device to the portable monitor, or by comparing data gathered by both the stationary device and the portable monitor.

21 Claims, 16 Drawing Sheets

(56) References Cited

U.S. PATENT DOCUMENTS

| | | | |
|---|---|---|---|
| 5,748,104 | A | 5/1998 | Argyroudis et al. |
| 5,872,588 | A | 2/1999 | Aras et al. |
| 5,917,425 | A * | 6/1999 | Crimmins et al. ............. 340/8.1 |
| 6,353,929 | B1 | 3/2002 | Houston |
| 6,539,393 | B1 * | 3/2003 | Kabala ......................... 707/102 |
| 6,647,548 | B1 | 11/2003 | Lu et al. |
| 7,155,159 | B1 | 12/2006 | Weinblatt et al. |
| 7,181,159 | B2 | 2/2007 | Breen |
| 7,460,827 | B2 | 12/2008 | Schuster et al. |
| 7,471,987 | B2 | 12/2008 | Crystal et al. |
| 7,770,193 | B2 | 8/2010 | Lee |
| 8,023,882 | B2 | 9/2011 | Croy et al. |
| 8,185,351 | B2 | 5/2012 | Crystal et al. |
| 8,225,342 | B2 | 7/2012 | Mears et al. |
| 8,555,304 | B2 | 10/2013 | Mears et al. |
| 2002/0129360 | A1 | 9/2002 | Lee |
| 2002/0178220 | A1 | 11/2002 | Smith et al. |
| 2003/0163831 | A1 | 8/2003 | Gall et al. |
| 2003/0171833 | A1 | 9/2003 | Crystal et al. |
| 2004/0019463 | A1 | 1/2004 | Kolessar et al. |
| 2005/0216509 | A1 * | 9/2005 | Kolessar et al. ........... 707/104.1 |
| 2006/0168613 | A1 | 7/2006 | Wood et al. |
| 2006/0242325 | A1 | 10/2006 | Ramaswamy et al. |
| 2007/0266395 | A1 | 11/2007 | Lee et al. |
| 2007/0288277 | A1 | 12/2007 | Neuhauser et al. |
| 2007/0288476 | A1 | 12/2007 | Flanagan, III et al. |
| 2007/0294705 | A1 | 12/2007 | Gopalakrishnan et al. |
| 2008/0109295 | A1 | 5/2008 | McConochie et al. |
| 2009/0037575 | A1 | 2/2009 | Crystal et al. |
| 2009/0169024 | A1 | 7/2009 | Krug et al. |
| 2009/0171767 | A1 | 7/2009 | Kolessar |
| 2010/0199296 | A1 | 8/2010 | Lee et al. |
| 2010/0269127 | A1 | 10/2010 | Krug |
| 2011/0099142 | A1 | 4/2011 | Karjalainen et al. |
| 2011/0106587 | A1 | 5/2011 | Lynch et al. |
| 2011/0153391 | A1 | 6/2011 | Tenbrock |
| 2012/0245978 | A1 | 9/2012 | Jain et al. |

FOREIGN PATENT DOCUMENTS

| | | |
|---|---|---|
| EP | 1133090 | 9/2001 |
| EP | 1213860 | 6/2002 |
| JP | 2001-209881 | 8/2001 |
| JP | 2004-222129 | 8/2004 |
| JP | 2005-520393 | 7/2005 |
| JP | 2006-260275 | 9/2006 |
| WO | 9504430 | 2/1995 |
| WO | 9933206 | 7/1999 |
| WO | 03/077455 | 9/2003 |
| WO | 03095945 | 11/2003 |
| WO | 2005071961 | 8/2005 |
| WO | 2006/037014 | 4/2006 |
| ZA | 20048525 | 3/2006 |

OTHER PUBLICATIONS

Apr. 8, 2009 Letter from John S. Macera (representing Kiefl) to Michael Skarzynski (of Arbitron) re: alleged patent infringement. (Exhibit 1 of the Apr. 22, 2009 Complaint in *Arbitron Inc.*, v. *John Barrett Kiefl* in United States District Court for the Southern District of New York. Case 1:09-cv-04013-PAC.).

Apr. 24, 2009 Letter from Michael Skarzynski (of Arbitron) to John S. Macera (representing Kiefl) re: alleged patent infringement.

European Patent Office, "Extended European Search Report," issued in connection with application No. 13002091.0, on Dec. 11, 2013, 9 pages.

United States Patent and Trademark Office, "Restriction Requirement," issued in connection with U.S. Appl. No. 10/970,585, on Apr. 16, 2008, 6 pages.

United States Patent and Trademark Office, "Restriction Requirement," issued in connection with U.S. Appl. No. 10/970,585, on Aug. 21, 2008, 9 pages.

United States Patent and Trademark Office, "Office Action," issued in connection with U.S. Appl. No. 10/970,585, on Oct. 29, 2008, 52 pages.

United States Patent and Trademark Office, "Office Action," issued in connection with U.S. Appl. No. 10/970,585, on Jun. 4, 2009, 47 pages.

United States Patent and Trademark Office, "Office Action," issued in connection with U.S. Appl. No. 10/970,585, on Oct. 27, 2009, 24 pages.

United States Patent and Trademark Office, "Office Action," issued in connection with U.S. Appl. No. 10/970,585, on May 10, 2010, 18 pages.

United States Patent and Trademark Office, "Office Action," issued in connection with U.S. Appl. No. 10/970,585, on Dec. 29, 2010, 26 pages.

United States Patent and Trademark Office, "Office Action," issued in connection with U.S. Appl. No. 10/970,585, on Aug. 18, 2011, 16 pages.

United States Patent and Trademark Office, "Notice of Allowance," issued in connection with U.S. Appl. No. 10/970,585, on Mar. 16, 2012, 14 pages.

United States Patent and Trademark Office, "Notice of Allowance," issued in connection with U.S. Appl. No. 13/526,415, on Jun. 10, 2013, 36 pages.

Australian Patent Office, "Patent Examination Report 3," issued in connection with application No. AU 2007316392, on Mar. 4, 2013, 4 pages.

European Patent Office, "Examination Report," issued in connection with application No. EP 07844943.6, on Aug. 12, 2013, 7 pages.

European Patent Office, "Extended European Search Report," issued in connection with application No. EP 07844943.6, on Dec. 30, 2010, 10 pages.

Walker, R., "Audio Watermarking," R&D White Paper WHP 057, BBC Research and Development, Aug. 31, 2004, 18 pages—in Extended European Search Report, issued in connection with application No. EP 07844943.6, on Dec. 30, 2010.

European Patent Office, "Examination Report," issued in connection with application No. EP 07844943.6, on Dec. 8, 2011, 5 pages.

State Intellectual Property Office of China, "First Office Action," issued in connection with application No. CN 200780047653.3, on Aug. 27, 2010, 8 pages.

State Intellectual Property Office of China, "Second Office Action," issued in connection with application No. CN 200780047653.3, on Jul. 20, 2011, 9 pages.

Israel Patent Office, "Office Action" with English summary, issued in connection with application No. IL198525, on Nov. 22, 2012, 4 pages.

Japanese Patent Office, "Office Action," issued in connection with application No. JP 2009-536460, mailed on Jun. 12, 2012, 5 pages.

Japanese Patent Office, "Office Action," issued in connection with application No. JP 2009-536460, mailed on Jun. 18, 2013, 10 pages.

Korean Intellectual Property Office, "Office Action," issued in connection with application No. KR 10-2009-7011445, on Dec. 12, 2013, 10 pages.

Mexico Patent Office, "Summary of Office Action," in connection with application No. MX/a/2009/004889, mailed on Jul. 1, 2013, 2 pages.

International Bureau, "International Preliminary Report on Patentability," issued in connection with application No. PCT/US2007/083940, on May 12, 2009, 4 pages.

International Searching Authority, "Written Opinion of the International Searching Authority," issued in connection with application No. PCT/US2007/083940, on Apr. 16, 2008, 3 pages.

International Searching Authority, "International Search Report," issued in connection with application No. PCT/US2007/083940, on Apr. 16, 2008, 1 page.

Australian Patent Office, "Patent Examination Report 1," issued in connection with application No. AU 2007316392, on Sep. 10, 2012, 3 pages.

Australian Patent Office, "Patent Examination Report 2," issued in connection with application No. AU 2007316392, on Jan. 2, 2013, 3 pages.

(56) References Cited

OTHER PUBLICATIONS

Intellectual Property Corporation of Malaysia, "Substantive Examination Adverse Report and Search Report," issued in connection with Malaysian Application No. PI20080006, on Dec. 31, 2008 (3 pages).
Intellectual Property Corporation of Malaysia, "Substantive Examination Adverse Report and Search Report," issued in connection with Malaysian Application No. PI20031501, on Aug. 14, 2009 (3 pages).
European Patent Office, "Supplementary European Search Report," issued in connection with application No. 03750041.0, on Oct. 19, 2010 (3 pages).
European Patent Office, "Communication and Examination," issued in connection with application No. 03750041.0, on Apr. 11, 2011 (7 pages).
State Intellectual Property Office of China, "Third Office Action with English Translation," issued in connection with application No. 200710139849.7, on Aug. 3, 2012 (6 pages).
State Intellectual Property Office of China, "Translation of the Second Office Action," issued in connection with application No. 200710139849.7, on Nov. 30, 2011 (1 page).
State Intellectual Property Office of China, "Redacted Translated Text of the First Office Action," issued in connection with application No. 200710139849.7, on Mar. 13, 2009 (2 pages).
State Intellectual Property Office of China, "Text of the First Office Action," issued in connection with application No. 03809075.9, on Sep. 7, 2007 (3 pages).
Mexican Patent Office, "Official Action with English Translation," issued in connection with application No. MX/a/2007/012204, on Jun. 8, 2010 (6 pages).
Patent Reexamination Board of the State Intellectual Property Office of China, "Text of the Notification of Reexamination," issued in connection with application No. 03809075.9, on Jul. 19, 2011 (7 pages).
State Intellectual Property Office of China, "Rejection Decision," issued in connection with application No. 03809075.9, on Jan. 15, 2010 (11 pages).
Korean Intellectual Property Office, "Translation of Notice of Preliminary Rejection," issued in connection with application No. 10-2004-7017055, on Nov. 30, 2009 (6 pages).
Government of India Patent Office, "First Examination Report," issued in connection with application No. 2346/CHENP/2004, on Aug. 9, 2010 (2 pages).
Canadian Intellectual Property Office, "First Office Action," issued in connection with application No. 2,483,042, on Jun. 15, 2010 (8 pages).
Canadian Intellectual Property Office, "Second Office Action," issued in connection with application No. 2,483,042, on Oct. 11, 2011 (5 pages).
International Preliminary Examining Authority, "International Preliminary Examination Report," issued in connection with application No. PCT/US03/12371, on Feb. 22, 2005 (29 pages).
Intellectual Property Office of New Zealand, "Examination Report," issued in connection with application No. 556380, on Jul. 13, 2007 (1 page).
Mexican Patent Office, "Redacted English Summary of Office Action," issued in connection with application No. PA/a/2004/010349, on Jun. 6, 2007 (3 pages).
United States Patent and Trademark Office, "Issue Notification," issued in connection with U.S. Appl. No. 10/970,585, on Jun. 27, 2012, (1 page).
Canadian Intellectual Property Office, "Office Action," issued in connection with Canadian Application No. 2,483,042, on May 14, 2013, (5 pages).
Japanese Patent Office, "Final Rejection," issued in connection with JP Application No. P2009-536460, on Jan. 28, 2014, 5 pages.

* cited by examiner

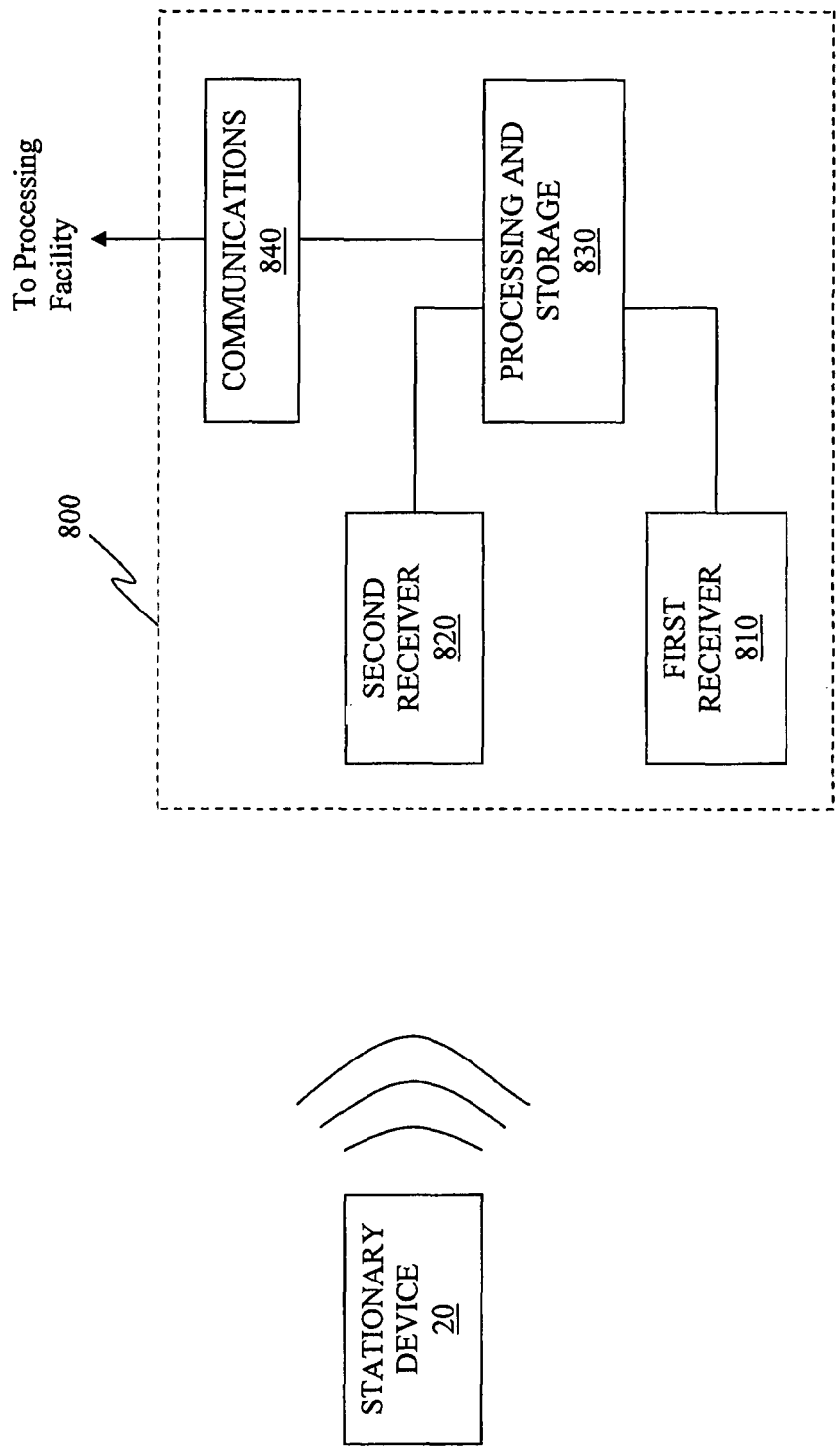

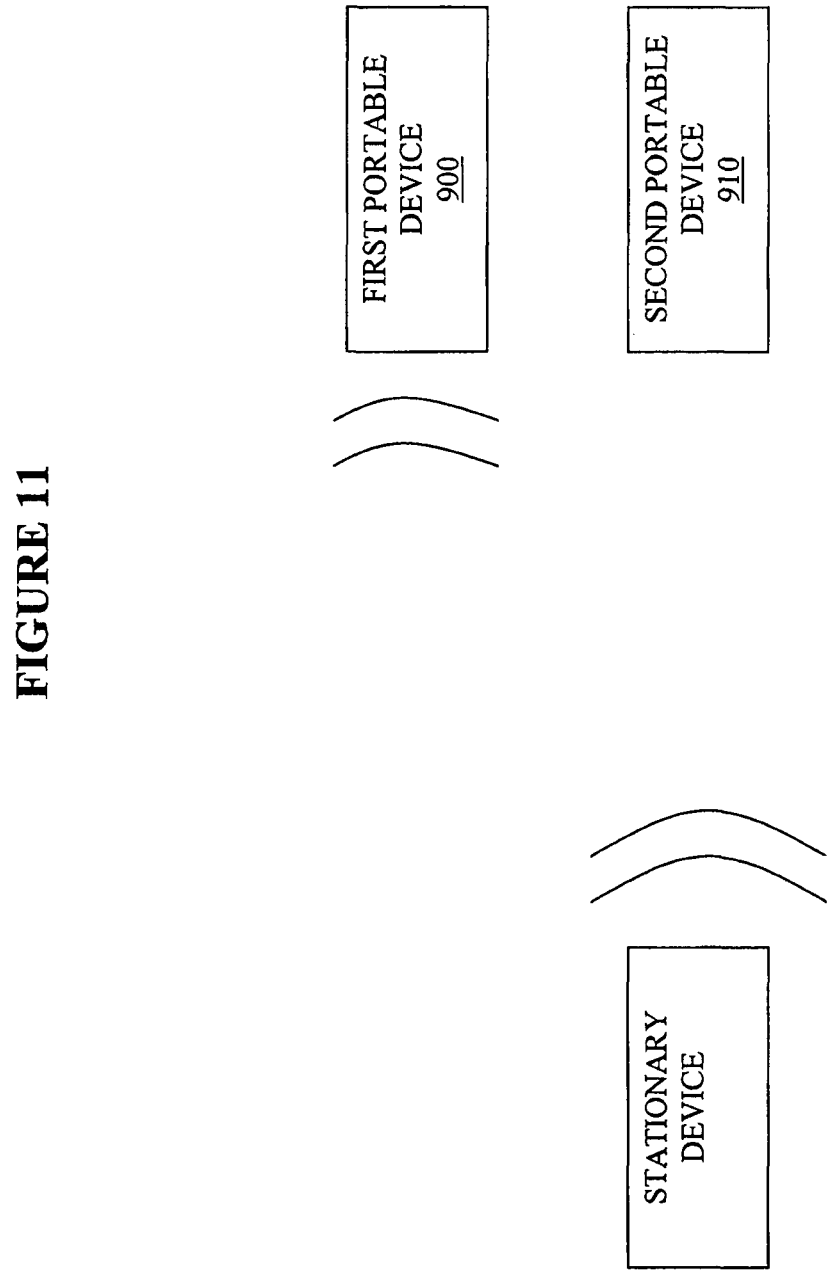

FIGURE 14

| Band No. | | | | | | | | | | | | | | |
|---|---|---|---|---|---|---|---|---|---|---|---|---|---|---|
| 10 | | | | | X | | | | X | | | | | |
| 9 | | | | X | | | | X | | | | | X | |
| 8 | | | X | | | | X | | | | | X | | |
| 7 | | X | | | | X | | | | | X | | | |
| 6 | X | | | | | X | | | | X | | | | |
| 5 | | | | X | | | | | X | | | | | |
| 4 | | | | X | | | | X | | | | | | X |
| 3 | | | X | | | | | X | | | | | X | |
| 2 | | X | | | | X | | | | | X | | | |
| 1 | X | | | | X | | | | X | | | | | |
| Time Intervals | 1 | 2 | 3 | 4 | 5 | 6 | 7 | 8 | 9 | 10 | 11 | 12 | 13 | 14 |

RESEARCH DATA GATHERING WITH A PORTABLE MONITOR AND A STATIONARY DEVICE

CROSS-REFERENCE TO RELATED APPLICATIONS

This application is a continuation-in-part of U.S. application Ser. No. 10/811,174, filed Mar. 26, 2004, now U.S. Pat. No. 7,483,975, and claims priority from U.S. Provisional Application No. 60/857,714, filed Nov. 7, 2006, the content of both of which are incorporated herein by reference in their entirety.

Systems and processes for use in gathering research data using a portable monitor and a stationary device are disclosed.

FIG. 10 illustrates a portable monitor having separate receivers for receiving ancillary codes and location codes;

FIG. 11 illustrates a monitoring system in which a panelist carries two portable devices;

FIG. 14 is used in explaining an audio signature extraction process.

Figure 1:
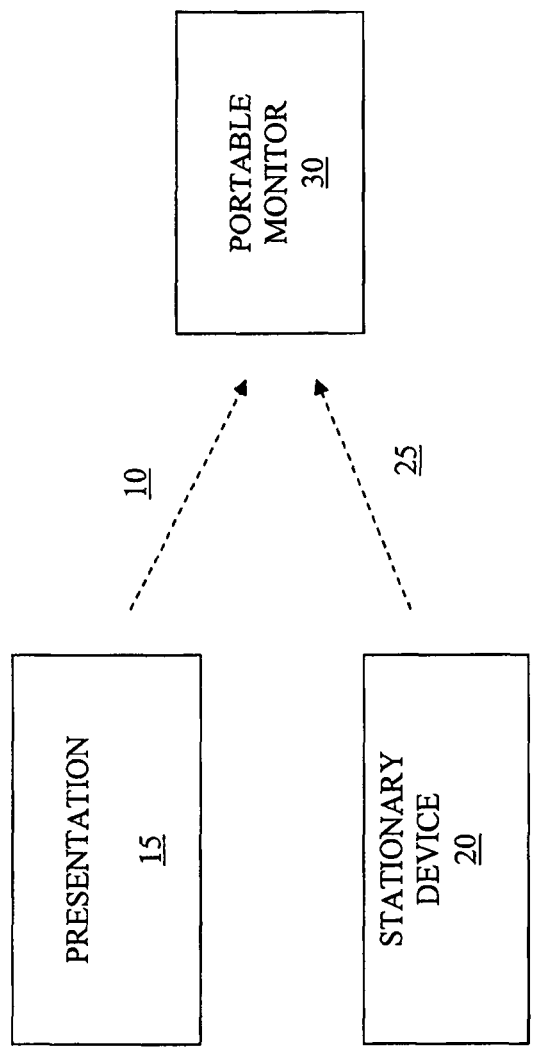
FIG. 1 is a functional block diagram illustrating certain embodiments of a system for gathering research data using a portable monitor and a stationary device.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, audio/video, text, images, animations, databases, broadcasts, displays (including but not limited to video displays, posters and billboards), signs, signals, web pages, print media and streaming media data.

The term "research data" as used herein means data comprising (1) data concerning usage of media data, (2) data concerning exposure to media data, and/or (3) market research data.

The term "presentation data" as used herein means media data, content other than media data or a message to be presented to a user.

The term "ancillary code" as used herein means data encoded in, added to, combined with or embedded in media data to provide information identifying, describing and/or characterizing the media data, and/or other information useful as research data.

The term "reading" as used herein means a process or processes that serve to recover research data that has been added to, encoded in, combined with or embedded in, media data.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

The term "network" as used herein includes both networks and internetworks of all kinds, including the Internet, and is not limited to any particular network or inter-network.

The terms "first", "second", "primary" and "secondary" are used to distinguish one element, set, data, object, step, process, activity or thing from another, and are not used to designate relative position or arrangement in time, unless otherwise stated explicitly.

The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," "communicating" and "communication" as used herein include both conveying data from a source to a destination, and delivering data to a communications medium, system, channel, network, device, wire, cable, fiber, circuit and/or link to be conveyed to a destination. The term "communications" as used herein includes one or more of a communications medium, system, channel, network, device, wire, cable, fiber, circuit and link.

The term "processor" as used herein means processing devices, apparatus, programs, circuits, components, systems and subsystems, whether implemented in hardware, software or both, and whether or not programmable. The term "processor" as used herein includes, but is not limited to one or more computers, hardwired circuits, signal modifying devices and systems, devices and machines for controlling systems, central processing units, programmable devices and systems, field programmable gate arrays, application specific integrated circuits, systems on a chip, systems comprised of discrete elements and/or circuits, state machines, virtual machines, data processors, processing facilities and combinations of any of the foregoing.

The terms "storage" and "data storage" as used herein mean one or more data storage devices, apparatus, programs, circuits, components, systems, subsystems, locations and storage media serving to retain data, whether on a temporary or permanent basis, and to provide such retained data.

The terms "panelist," "respondent" and "participant" are interchangeably used herein to refer to a person who is, knowingly or unknowingly, participating in a study to gather information, whether by electronic, survey or other means, about that person's activity.

The term "household" as used herein is to be broadly construed to include family members, a family living at the same residence, a group of persons related or unrelated to one another living at the same residence, and a group of persons (of which the total number of unrelated persons does not exceed a predetermined number) living within a common facility, such as a fraternity house, an apartment or other similar structure or arrangement, as well as such common residence or facility.

The term "portable user appliance" (also referred to herein, for convenience, by the abbreviation "PUA") as used herein means an electrical or non-electrical device capable of being carried by or on the person of a user or capable of being disposed on or in, or held by, a physical object (e.g., attaché, purse, clothing) capable of being carried by or on the user, and having at least one function of primary benefit to such user, including without limitation, a cellular telephone, a personal digital assistant ("PDA"), a Blackberry® device, a radio, a television, a game system (e.g., a Gameboy® device), a notebook computer, a laptop computer, a GPS device, a personal audio device (e.g., an MP3 player, an iPod® device), a DVD player, a two-way radio, a personal communications device, a telematics device, a remote control device, a wireless headset, a wristwatch, a portable data storage device (e.g., Thumb™ drive), a camera, a recorder, a keyless entry device, a ring, a comb, a pen, a pencil, a notebook, a wallet, a tool, a flashlight, an implement, a pair of glasses, an article of clothing, a belt, a belt buckle, a fob, an article of jewelry, an ornamental article, a pair of shoes or other foot garment (e.g., sandals), a jacket, and a hat, as well as any devices combining any of the foregoing or their functions.

The term "research device" as used herein shall mean (1) a portable user appliance configured or otherwise enabled to gather, store and/or communicate research data, or to cooperate with other devices to gather, store and/or communicate research data, and/or (2) a research data gathering, storing and/or communicating device.

FIG. 1 schematically illustrates a monitoring system for monitoring usage of content presented at a predetermined location, such as within a particular room in a household. Such content can be any one or more of content 10 presented 15 by a television; a radio; a home theater system; a media center; a display coupled with a video game system, personal computer, video reproducing device (such as a DVD player, a personal video player, a digital video recorder, video tape recorder or the like); a speaker or headphones coupled with a television, a radio, a video game system, personal computer, hi-fi system, personal audio player or the like.

The monitoring system comprises a stationary device 20 and a portable monitor 30. In certain embodiments, stationary device 20 serves to produce location data 25 to be received by portable monitor 30 and providing an indication of a location of the portable monitor 30 proximate to the presentation 15. In certain embodiments, stationary device comprises a set-top box (STB) or IRR. The location data received by the portable monitor 30 is stored thereby and/or communicated to a processing facility (not shown for purposes of simplicity and clarity). In certain embodiments, the stationary device 20 carries out multiple functions for monitoring usage of content and/or to assist such monitoring. In addition to producing the location data 25, such functions include reading codes present in the content, obtaining channel selection data, people meter functions, and the like.

In certain embodiments, the portable monitor 30 also receives a wireless signal providing the information that the portable monitor 30 is in the household of the panelist to whom it was assigned. This enables the use of a low data rate location code, since it is then only necessary to distinguish the panelist's presence in a particular one of a handful of rooms in the household. In certain embodiments, such wireless signal is a low power RF signal encoded to inform the portable monitor 30 that it is "in home".

In certain embodiments, stationary device 20 receives presence data from portable monitor 30 in place of, or in addition to, producing the location data 25. In certain ones of these embodiments, such presence data comprises portable monitor identification data, panelist identification data and/or demographic data of the panelist to whom the portable monitor has been assigned.

A method of gathering data concerning a location of an audience member proximate to a content presentation comprises providing a portable monitor to an audience member, providing a stationary device proximate to a content presentation, and at least one of communicating location data to the portable monitor from the stationary device and communicating portable monitor and/or audience member identification data to the stationary device from the portable monitor.

Location data is communicated in various ways, depending on the embodiment. In certain embodiments, the location data is communicated by a wire, cable, optical fiber or the like. In certain embodiments, the location data is communicated wirelessly as acoustic energy (whether in the audible frequency range, at ultrasonic frequencies and/or at subsonic frequencies), electromagnetic energy (such as RF, infrared light or visible light), a magnetic field and/or an electric field.

A method of gathering data concerning a location of an audience member proximate to a content presentation comprises communicating location data from a stationary device proximate to the content presentation to a portable monitor carried on or with the person of an audience member, and/or communicating at least one of portable monitor identification data, audience member identification data and audience member demographic data to the stationary device.

In certain embodiments, location data and/or presence data are communicated as encoded acoustic energy. Various techniques for encoding audio for producing such encoded acoustic energy, and for reading the same, are disclosed in U.S. Pat. No. 5,764,763 to Jensen et al., U.S. Pat. No. 5,450,490 to Jensen et al., U.S. Pat. No. 5,579,124 to Aijala et al., U.S. Pat.

No. 5,581,800 to Fardeau et al., U.S. Pat. No. 6,871,180 to Neuhauser, et al., U.S. Pat. No. 6,845,360 to Jensen, et al., U.S. Pat. No. 6,862,355 to Kolessar, et al., U.S. Pat. No. 5,319,735 to Preuss et al., U.S. Pat. No. 5,687,191 to Lee, et al., U.S. Pat. No. 6,175,627 to Petrovich et al., U.S. Pat. No. 5,828,325 to Wolosewicz et al., U.S. Pat. No. 6,154,484 to Lee et al., U.S. Pat. No. 5,945,932 to Smith et al., US 2001/0053190 to Srinivasan, US 2003/0110485 to Lu, et al., U.S. Pat. No. 5,737,025 to Dougherty, et al., US 2004/0170381 to Srinivasan, and WO 06/14362 to Srinivasan, et al., all of which hereby are incorporated by reference herein.

Examples of techniques for encoding data in audio that may be reproduced as encoded acoustic energy, and for reading such data, are described in Bender, et al., "Techniques for Data Hiding", *IBM Systems Journal*, Vol. 35, Nos. 3 & 4, 1996, which is incorporated herein in its entirety. Bender, et al. disclose a technique for encoding audio termed "phase encoding" in which segments of the audio are transformed to the frequency domain, for example, by a discrete Fourier transform (DFT), so that phase data is produced for each segment. Then the phase data is modified to encode a code symbol, such as one bit. Processing of the phase encoded audio to read the code is carried out by synchronizing with the data sequence, and detecting the phase encoded data using the known values of the segment length, the DFT points and the data interval.

Bender, et al. also describe spread spectrum encoding and code reading, of which multiple embodiments are disclosed in the above-cited Aijala, et al. U.S. Pat. No. 5,579,124.

Still another audio encoding and reading technique described by Bender, et al. is echo data hiding in which data is embedded in a host audio signal by introducing an echo. Symbol states are represented by the values of the echo delays, and they are read by any appropriate processing that serves to evaluate the lengths and/or presence of the encoded delays.

A further technique, or category of techniques, termed "amplitude modulation" is described in R. Walker, "Audio Watermarking", BBC Research and Development, 2004. In this category fall techniques that modify the envelope of the audio signal, for example by notching or otherwise modifying brief portions of the signal, or by subjecting the envelope to longer term modifications. Processing the audio to read the code can be achieved by detecting the transitions representing a notch or other modifications, or by accumulation or integration over a time period comparable to the duration of an encoded symbol, or by another suitable technique.

Another category of techniques identified by Walker involves transforming the audio from the time domain to some transform domain, such as a frequency domain, and then encoding by adding data or otherwise modifying the transformed audio. The domain transformation can be carried out by a Fourier, DCT, Hadamard, Wavelet or other transformation, or by digital or analog filtering. Encoding can be achieved by adding a modulated carrier or other data (such as noise, noise-like data or other symbols in the transform domain) or by modifying the transformed audio, such as by notching or altering one or more frequency bands, bins or combinations of bins, or by combining these methods. Still other related techniques modify the frequency distribution of the audio data in the transform domain to encode. Psychoacoustic masking can be employed to render the codes inaudible or to reduce their prominence. Processing to read ancillary codes in audio data encoded by techniques within this category typically involves transforming the encoded audio to the transform domain and detecting the additions or other modifications representing the codes.

A still further category of techniques identified by Walker involves modifying audio data encoded for compression (whether lossy or lossless) or other purpose, such as audio data encoded in an MP3 format or other MPEG audio format, AC-3, DTS, ATRAC, WMA, RealAudio, Ogg Vorbis, APT X100, FLAC, Shorten, Monkey's Audio, or other. Encoding involves modifications to the encoded audio data, such as modifications to coding coefficients and/or to predefined decision thresholds. Processing the audio to read the code is carried out by detecting such modifications using knowledge of predefined audio encoding parameters.

It will be appreciated that various known encoding techniques may be employed, either alone or in combination with the above-described techniques. Such known encoding techniques include, but are not limited to FSK, PSK (such as BPSK), amplitude modulation, frequency modulation and phase modulation.

Figure 2:
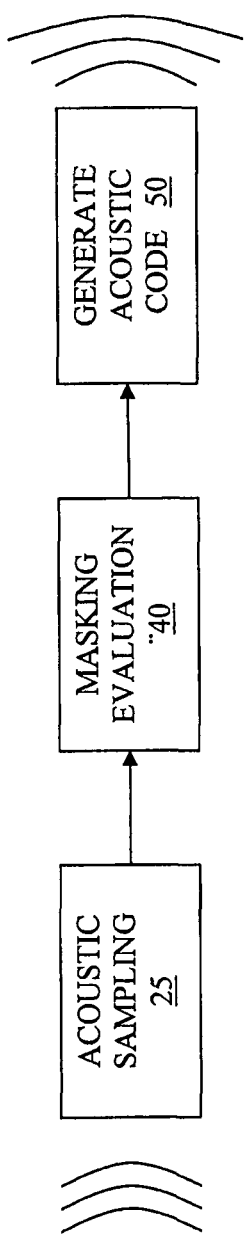
FIG. 2 is a functional block diagram illustrating an operation of certain ones of the FIG. 1 embodiments to emit an acoustic location code and/or a presence code.

FIG. 2 is a functional block diagram for illustrating an operation of the stationary device 20 to produce acoustic location data within the audible frequency range and an operation of the portable monitor 30 to produce acoustic portable monitor identification data, acoustic audience member identification data and/or demographic data within the audible frequency range. In the embodiments of FIG. 2, the acoustic data is masked so that it is inaudible to human hearing. Ambient acoustic energy is sampled 25 by an acoustic transducer of the stationary device 20 and/or the portable monitor 30 (not shown for purposes of simplicity and clarity). The sampled acoustic energy is evaluated 40 to assess its ability to mask acoustic codes communicated in the vicinity of stationary device 20 and the portable monitor 30. The masking evaluation is carried out in accordance with psychoacoustic masking principles. In certain embodiments, one or more of tonal masking, narrow-band masking and broadband masking effects are evaluated to produce evaluation data from which code magnitudes at various frequencies may be selected such that, the codes remain inaudible when reproduced as sound but have advantageously high magnitudes to assist in distinguishing them from noise. In certain embodiments, two or more such masking evaluations are added to determine the permissible code magnitudes. In certain embodiments, the masking evaluation is carried out in accordance with techniques disclosed in U.S. Pat. No. 5,764,763 assigned to the assignee of the present application and incorporated herein by reference in its entirety.

The masking evaluation produces masking data indicating permissible magnitudes, frequencies, timings and/or durations of the acoustic data to be produced and/or of various portions or components thereof. The masking data is supplied to an acoustic data generator 50 which responds by generating the acoustic location or identification data so that it is masked to human hearing.

Figure 3:
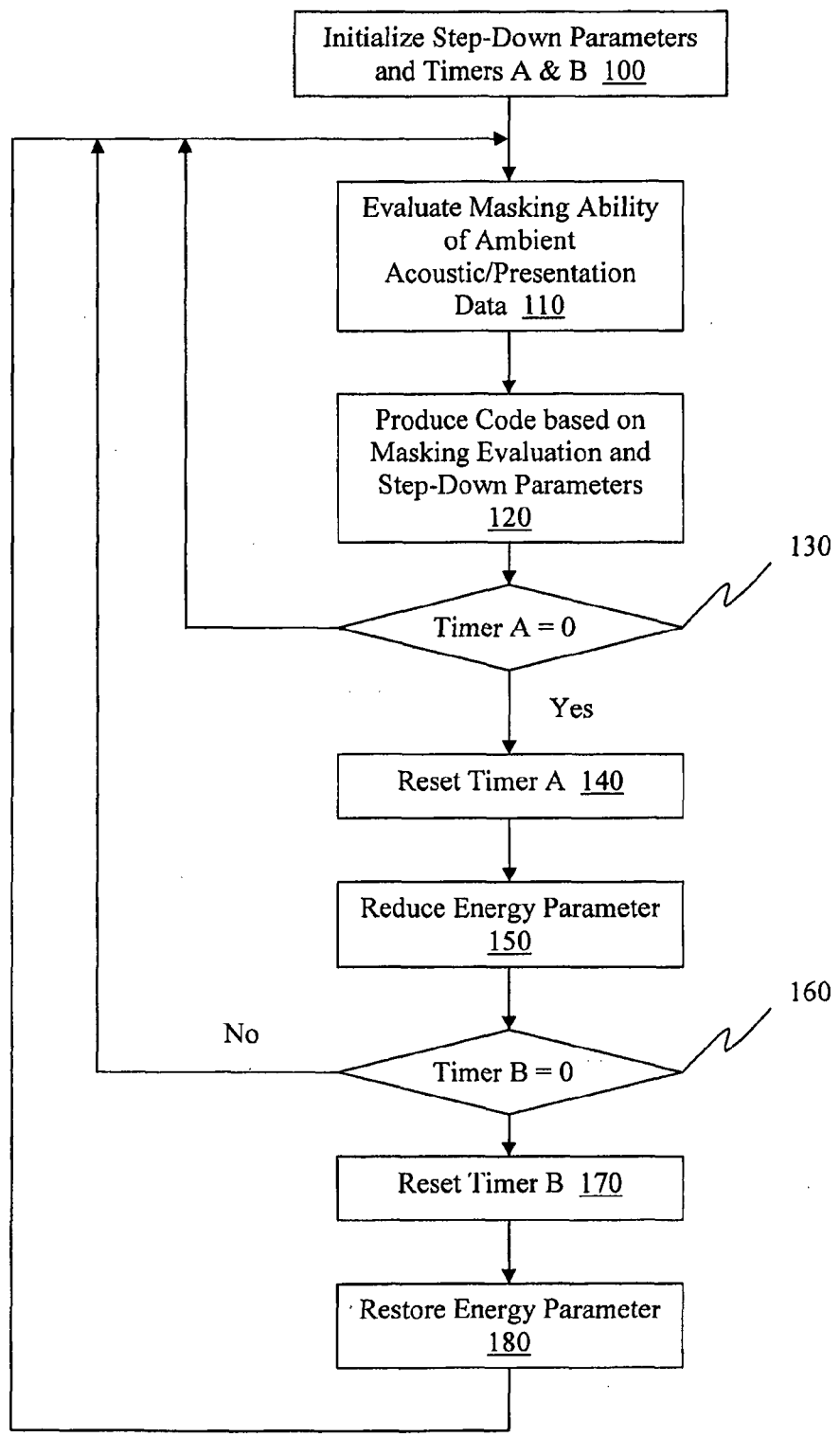
FIG. 3 is a flow diagram of certain embodiments for communicating location codes according to a "step-down" method.

FIG. 3 is a flow diagram illustrating certain embodiments in which the stationary device 20 communicates encoded location data to the portable monitor 30 as inaudible acoustic energy within the audible frequency band, and in a manner that assists the portable monitor 30 to distinguish encoded acoustic energy produced within the same room as the portable monitor from acoustic codes produced in other rooms that are nevertheless picked up by portable monitor 30. More particularly, the embodiments of FIG. 3 employ a "step-down" code in which the code energy content is reduced in a step-wise fashion throughout some period of time. When the period of time expires, the code energy is restored to a previous maximum level and the step-down process is repeated. This procedure is repeated so long as the acoustic code is being produced. In the event that the portable monitor receives two such codes during the same interval, it selects the code successfully read at the lowest energy level as representing the location of the portable monitor (and thus the panelist carrying it). This technique takes advantage of attenuation of acoustic codes as they pass through walls to distinguish codes produced in the same room as the portable monitor 30.

As shown in FIG. 3, the encoding process is commenced 100 by initializing energy parameters, such as data representing a maximum code energy level and the energy reduction or level at each or various ones of the steps. As also indicated at 100, a timer A is initiated at a count representing a duration of each step and a timer B is initiated at a count representing a duration of the time period for completing the step-down procedure. The masking ability of the ambient acoustic energy and/or acoustic presentation data adjacent a speaker of the presentation 15 is evaluated 110 and stationary device 20 produces 120 an acoustic location code based both on the masking evaluation 110, a current energy parameter. During the first pass through the process of FIG. 3, the current energy parameter is set at a maximum level. During subsequent passes through the process and until completion of the step-down procedure, the current energy parameter is adjusted to progressively lower levels at the completion of each step.

At 130, timer A is checked to determine if it has timed out. If not, processing returns to 110 to continue producing the acoustic code using unmodified parameters. If the timer has timed out (that is, timer=0), which represents an end of a current step, the timer is reset 140 and the current energy parameter is reduced to the level for the next step. At 160, timer B is checked to determine if it has timed out. If not, processing returns to 110 to continue producing the code at the reduced energy level represented by the current energy parameter set at 150. However, if timer B has timed out, which represents the end of the current step-down procedure, timer B is reset 170 and the current energy parameter is restored 180 to a value representing the maximum code energy level.

In certain ones of the FIG. 3 embodiments, the current energy parameter is replaced by a scale factor that is applied to data representing the ambient acoustic energy or the acoustic energy of the presentation data adjacent a speaker, so that for each step following the first, such energy data is reduced by the scale factor. This will automatically result in a reduction of the code energy, since the capacity of acoustic energy to mask a code is reduced as the amount of such acoustic energy is reduced.

In certain ones of the FIG. 3 embodiments, the code energy level is reduced by a predetermined amount, such as 5 dB every 10 seconds, until the step-down procedure is completed. In a particular encoding technique employed in certain ones of the FIG. 3 embodiments, the stationary monitor 20 regenerates the presentation data picked up at the speaker including a sequence of code symbols each as a unique combination of single-frequency code components so that the code is masked by the regenerated presentation data. In certain ones of such embodiments, the code symbols are produced as disclosed in U.S. Pat. No. 5,764,763, assigned to the assignee of the present application and hereby incorporated herein by reference. The encoded, regenerated presentation data is reproduced acoustically after an indiscernible delay, for example, a delay of less than 30 ms. In certain ones of these embodiments in which the portable monitor 30 is able to unambiguously sample the ambient acoustic energy up to X kHz and reads broadcast codes at frequencies up to X-Y kHz (where X and Y are positive, and X>Y), the code components generated by the stationary monitor fall in the range X-Y kHz to X kHz. In such embodiments, the presentation data is sampled at a tweeter or mid-range speaker of the presentation, as appropriate. In other ones of such embodiments, the code components produced by the stationary device 20 are included at frequencies below X-Y kHz that are not used by such broadcast codes. Any of the other encoding techniques described hereinabove may be used in place of that disclosed by U.S. Pat. No. 5,764,763.

In certain embodiments, in place of an audible frequency band code, the technique of FIG. 3 employs an ultrasonic acoustic code.

Figure 4:
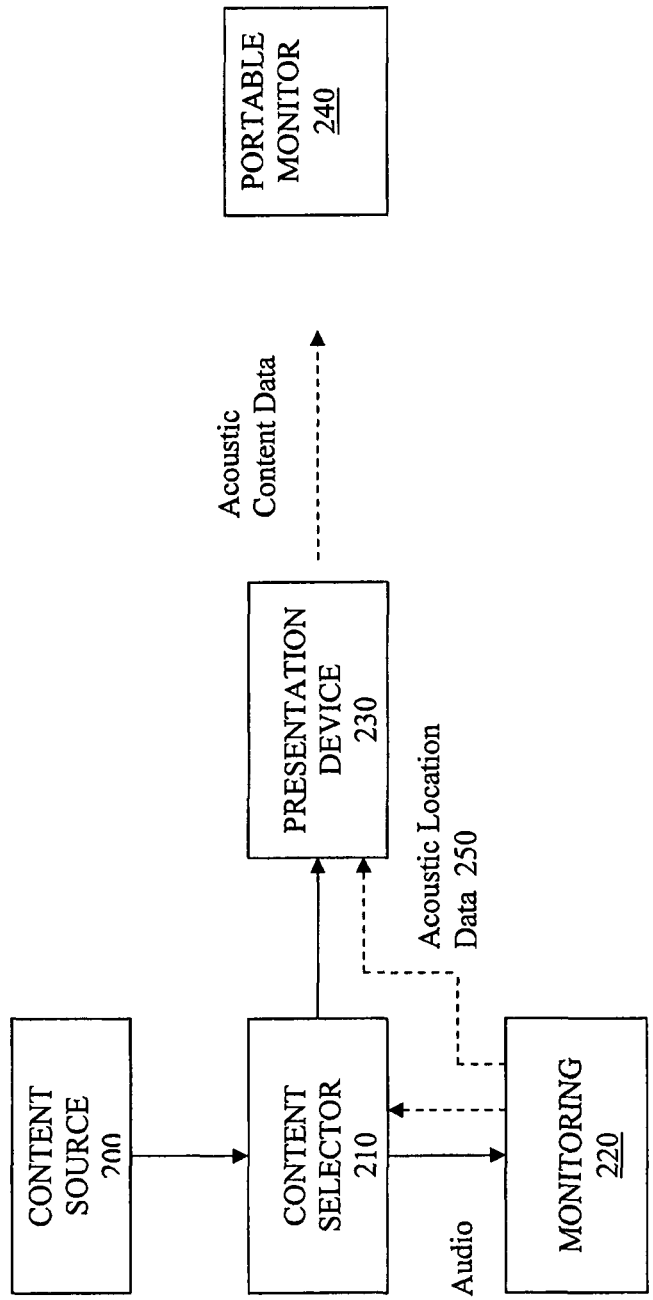
FIG. 4 depicts certain embodiments of a monitoring system comprising a stationary monitor and a portable monitor.

FIG. 4 depicts a monitoring system comprising a stationary monitor 220 and a portable monitor 240 carried on the person of a panelist present in the same room of a household as a content selection and presentation system comprising a content selector 210 and a presentation device 230. A source of content 200 may be present in the same room or may be located elsewhere. The presentation device may be a device such as a television, a video game system, a hi-fi system, a radio, a personal computer, a video and/or audio player, a home theater system, a media center and the like.

The content source 200 may be local or remote. It may be a cable television system, satellite television system, video and/or audio recorder or player, game system, personal computer, or other content delivery network, such as the Internet.

The content selector 210 may be a cable box, a satellite box, a content distribution system, a digital entertainment center or the like.

The content source 200, content selector 210 and presentation device 230 may be separate, or two or more may be embodied in a single device.

The monitoring system 220 receives audio data 240 from the content selector 210, either as baseband data, audio IF, broadcast data or otherwise encoded audio data.

As will be explained below, the acoustic location data 250 comprises data in the audible frequency range and it is masked, using the methods described above, to ensure it will be inaudible, imperceptible or at least inconspicuous. The acoustic location data 250 is added to or used to modify audio data 240 in some other fashion to encode location information in audio data, and finally reproduced as acoustic content data 260.

The monitoring system 220 evaluates a masking ability of the received audio data and, based on such evaluation, produces acoustic location data 250 indicating a location of presentation device 230, (e.g., a television in a particular room within a household). The monitoring system 220 then supplies the acoustic location data 250 to the content selector 210 or the presentation device 230 to be added to the audio data 240 and reproduced as encoded acoustic content data 260 from the presentation device 230 to the portable monitor 240.

As an alternative, the monitoring system 220 receives audio data 240 from the content source 200 and supplies the acoustic location data 250 to the content source 200, content selector 210 or presentation device 230 to be added to audio data 240.

As another alternative, the monitoring system 220 receives audio data 240 from content source 200 or content selector 210, produces acoustic location data 250, adds it to the audio data 240 or modifies the audio data 240 based on the acoustic location data 250, to encode the audio data 240 and supplies the encoded audio data to the presentation device 230, the content selector 210 or the content source 200 as a replacement for the original audio data 240.

The monitoring system 220 may include a channel or source monitoring function, and/or a content identification function, and may be implemented by decoding data encoded in audio and/or video of content, and/or by extracting audio and/or video signatures for matching with signatures representing content whose source and/or content is known.

The portable monitor 240 picks up the acoustically reproduced audio, decodes the location data therein, and stores it with a time stamp. The stored data is communicated to a processing facility where it is used to produce reports of audience size and composition (demographics).

Figure 5:
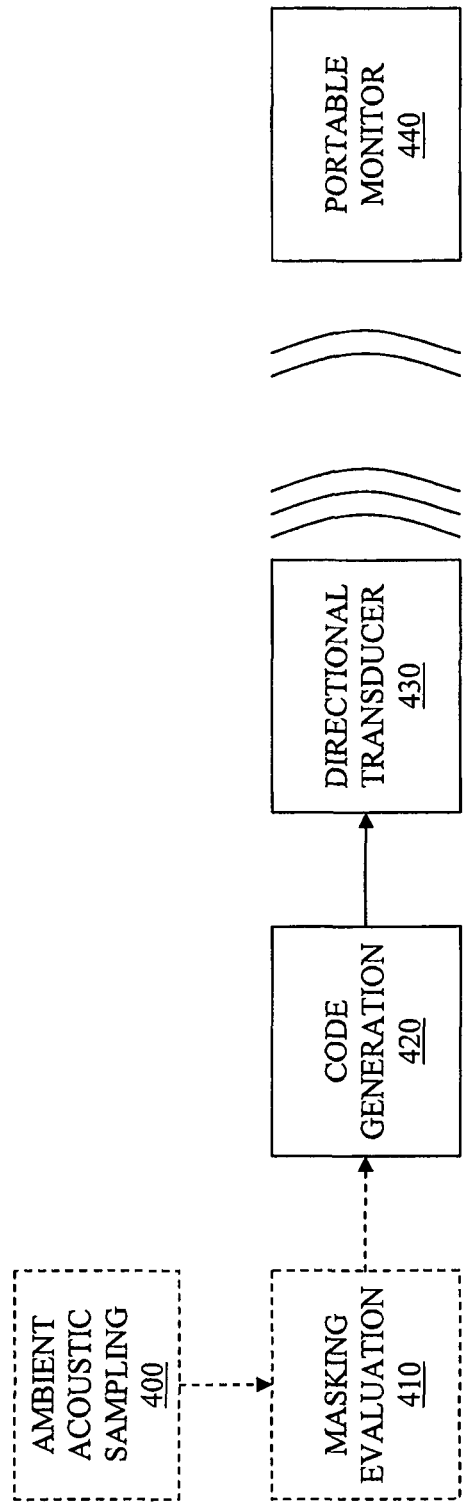
FIG. 5 is a functional a block diagram of a directional acoustic location code producing technique employed in certain embodiments.

FIG. 5 is a functional block diagram of a directional acoustic location code producing technique employed in certain embodiments of stationary device 20 of FIG. 1 employing a directional acoustic transducer 430 to enable limiting detectability of acoustic codes to the area in front of a presentation device, such as a television. Accordingly, for a given portable monitor 440 carried on the person of a panelist to read such location codes, the panelist must be in a predetermined area in front of the presentation device.

Codes are generated 420 for driving transducer 430 either in the audible frequency range or at ultrasonic frequencies. The codes may be produced in any of the ways explained hereinabove, as well as still further ways known in the art.

In certain embodiments, the ambient acoustic energy is sampled in step 400 and its masking ability is evaluated in step 410. These two steps are optional, depending on code characteristics. Where masking is employed, data representing the masking abilities of the ambient acoustic energy is supplied for use in generating a code that will be masked when reproduced as acoustic energy by transducer array 430. With certain code techniques, PSK, FSK, or the like, masking 410 is preferable to avoid audibility. Acoustic spread spectrum codes that have individual frequency components of low magnitude might not require masking 410, depending on their energy levels and frequencies. Low level acoustic pulses of short duration might also not require masking 410 if they are sufficiently short in duration.

In certain embodiments the directional transducer 430 comprises a phased array of acoustic transducers. In other embodiments, the directional transducer 430 comprises an acoustic transducer arranged at the focus of a parabolic reflector. In other embodiments, the directional transducer 430 comprises an acoustic transducer in combination with other kinds of focusing devices, such as piezoelectric flat panel focusing devices.

In certain embodiments, the directional transducer 430 comprises an array of ultrasonic transducers arranged to produce a directional ultrasonic beam when excited with ultrasonic energy. The ultrasonic energy is amplitude modulated with a location code in the audible frequency range. Amplitude modulation results in the production of two ultrasonic frequencies that heterodyne in the air to produce the location code in the audible frequency band with the directional characteristics of the ultrasonic beam.

In certain embodiments, the portable monitor 440 having an acoustic transducer for receiving inaudible broadcast codes in the frequency range of 1 to 3 kHz, receives acoustic location codes at frequencies above 3 kHz. Stationary device 20 is arranged to produce such acoustic location codes with directional transducer 430 to be received by the acoustic transducer of portable monitor 440. Higher frequency acoustic codes are in general more convenient for achieving directional transmission of the codes and are attenuated to a greater extent than lower frequency acoustic codes when passing through walls, thus assisting in avoiding "spillover" of location codes into other rooms.

Figure 6:
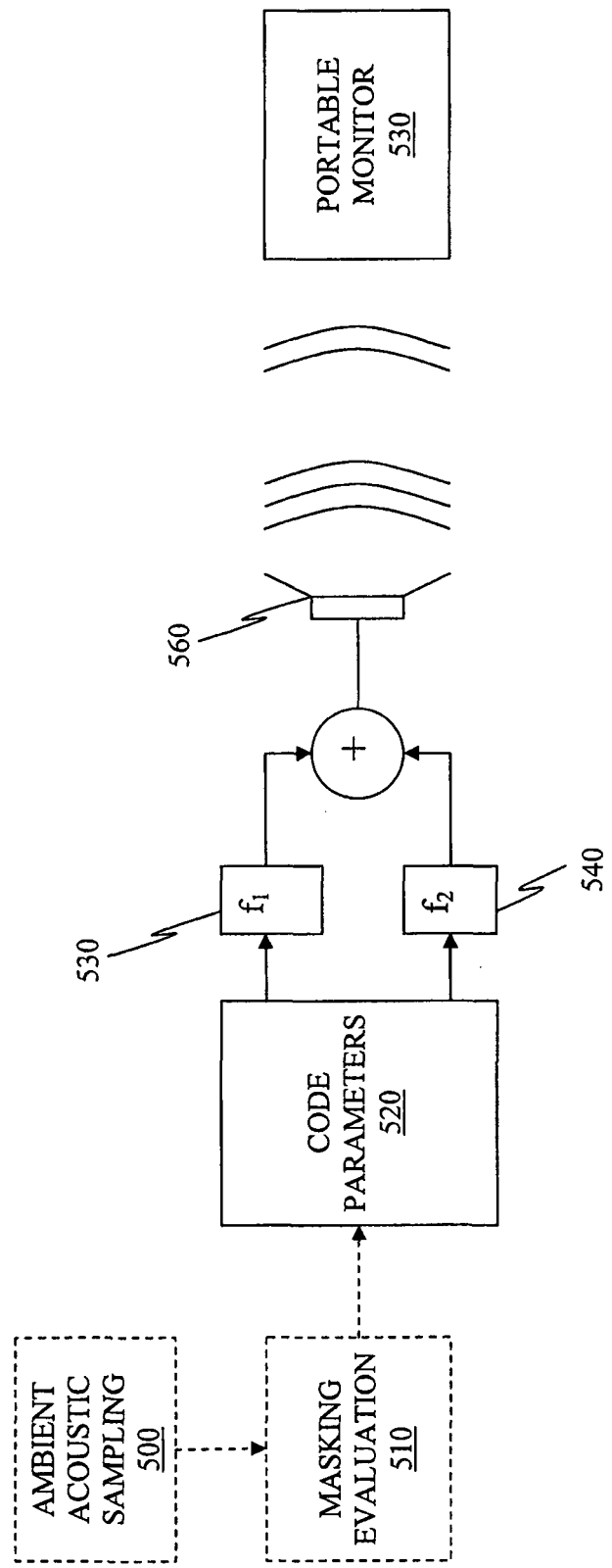
FIG. 6 is a block diagram illustrating techniques for producing directional location codes based on code characteristics.

FIG. 6 is a block diagram illustrating techniques for producing directional location codes based on the characteristics of code signals used to excite a speaker/transducer 560. A plurality of single frequency code components 530 and 540 are produced, each of which is harmonically related to at least one of the other components and is produced so that it is in phase with the other as supplied to the speaker 560. Because of the harmonic relationship of each code component 530 and 540 and because they are in phase as supplied to the speaker, they remain in phase in front of the speaker, so that they are detectable by portable monitor 550. However, as portable monitor 550 is moved away from the area in front of the speaker, the components 530 and 540 become out of phase and also experience increased interference from multipath (i.e., reflected) components, so that they ultimately become undetectable by portable monitor 550. To the extent that the components 530 and 540 pass through a wall, they become further attenuated and their phase relationship becomes further distorted, so that detection in other rooms can be prevented or substantially impaired.

In certain embodiments, the ambient acoustic energy is sampled in step 500 and its masking ability is evaluated in step 510. These two steps are optional, depending on code characteristics. The masking ability 510 of ambient acoustic energy is evaluated in some embodiments to ensure inaudibility or suppressed audibility of location codes. Ambient acoustic sampling 500 and masking evaluation 510 may be unnecessary if code components are kept below the absolute human audibility threshold at the frequency of each respective code component 530 and 540 or if they are slightly audible and nevertheless deemed acceptable.

Code parameters 520 may control one or more of the following: (1) selection of groups of code components, each having a different frequency, to encode different symbols and symbol sequences representing the location code, (2) selection of component durations to represent location information or to ensure masking, and (3) selection of component magnitudes to ensure masking or to encode location information. Note that while only two code components 530 and 540 are illustrated in FIG. 6, it will be appreciated that any finite number of code components greater than one may be used.

Figure 7:
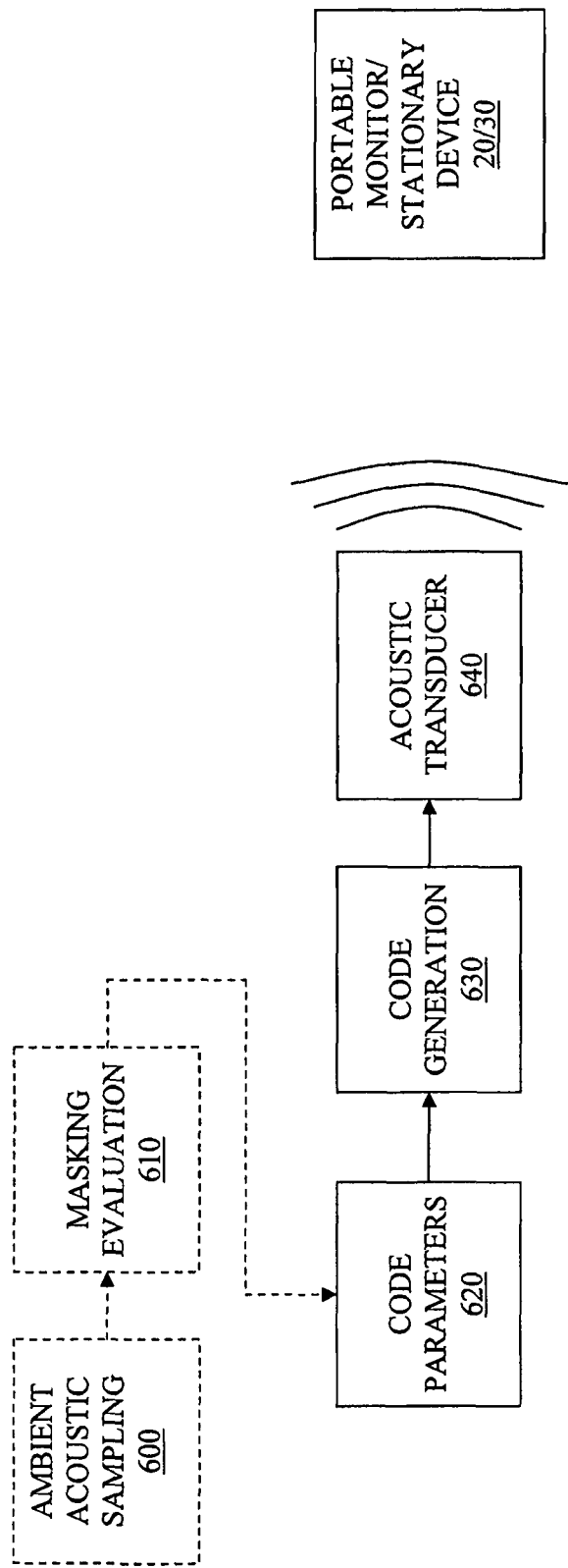
FIG. 7 illustrates certain techniques for producing codes in a stationary device and/or in a portable monitor.

In certain embodiments, acoustic location codes are produced in the stationary device 20 and/or acoustic identification and/or panelist demographics codes are produced in the portable device 30. FIG. 7 illustrates certain techniques for producing such codes in stationary device 20 and/or in portable monitor 30. Code parameters are selected 620 to: (1) reduce spillover of codes into other rooms to an acceptably low level and (2) to maintain codes either inaudible or with characteristics that, while audible to some extent, are nevertheless deemed acceptable. In certain embodiments, such code parameters include one or more of (1) code magnitude and/or code component magnitudes, (2) code duration and/or code component durations, and (3) code frequency or frequencies.

In certain embodiments, the ambient acoustic energy is sampled 600 and the masking ability of such energy is evaluated 610. These two steps are optional, depending on code characteristics. The masking ability of ambient acoustic energy is evaluated in some embodiments to ensure inaudibility or suppressed audibility of location codes. Ambient acoustic sampling 600 and masking evaluation 610 may be unnecessary if code components are kept below the absolute human audibility threshold at the frequency of each respective code component or if they are slightly audible and deemed acceptable.

In certain embodiments, certain types of encoding techniques produce low level acoustic codes in the audible frequency band that are perceived, if at all, as noise. Therefore, these low level acoustic codes may be acceptable for use as location codes even without taking measures to ensure that the codes will be inaudible. These encoding techniques include various spread spectrum encoding techniques, such as direct sequence spread spectrum encoding and frequency hopping spread spectrum encoding.

In certain embodiments, the acoustic codes are produced as a sequence of code symbols in a manner similar to the techniques disclosed in U.S. Pat. No. 5,764,763 issued Jun. 9, 1998, in the name of James M. Jensen et al., which is incorporated by reference herein in its entirety, that is, in which each symbol is represented by a unique combination of single frequency code components. Masking 610 is used in embodiments that employ such codes to ensure inaudibility. In certain ones of such embodiments, the frequencies of the code components are within a range of audible frequencies that also accommodate broadcast codes of the kind disclosed in U.S. Pat. No. 5,764,763, but which fall within frequency bins not used by such broadcast codes. Further techniques that permit encoding of such location codes and identification codes in the same frequency range as such broadcast codes are disclosed in U.S. Pat. No. 6,845,360 issued Jan. 18, 2005, in the name of James J. Jensen et al., which is assigned to the assignee of the present application and is incorporated by reference herein it its entirety.

In certain embodiments, the same method as indicated in the above paragraph is used but inserts the code frequency components at frequencies above those used to encode the broadcast codes, such as 3 kHz to 4 kHz. This range is not exclusive of higher frequency ranges. The use of location codes and identification codes at higher audible frequencies helps avoid problems with "spillover", since higher frequency acoustic energy is attenuated to a greater extent as it passes through walls. However, any of the encoding techniques described hereinabove may be used in place of or in addition to those described in U.S. Pat. No. 5,764,763 and U.S. Pat. No. 6,845,360.

In certain embodiments, the location codes and identification/demographics codes are produced as one or more band-limited or short-duration pulses in the audible frequency range. These can be used in systems that also detect broadcast codes such as those disclosed in U.S. Pat. No. 5,764,763, by selecting the bands for the pulses to fall outside the frequency bins used to encode the broadcast codes, either by selecting unused bands within the same range of frequencies as the broadcast codes or by using bands outside such frequency range. If pulse duration is less than 200 ms, the sensitivity of the human ear to the pulse is reduced, as represented by a higher threshold of audibility. Accordingly, such pulses can be kept inaudible, with or without masking by ambient acoustic energy, by keeping their duration shorter than 200 ms and ensuring that their Sound Pressure Levels (SPL) do not exceed the increased threshold of audibility at such short duration and for the frequency band in which the pulse is confined.

The location or identification information can be encoded in a number of ways: (1) pulse repetition rate or periodicity, (2) pulse duration, (3) selection of pulse frequency or frequencies, (4) combinations of the foregoing, and (5) patterns of repetition rates, pulse durations and pulse frequencies. Detection of the pulses in the portable monitor 30 or stationary device 20 can be carried out by a correlation analysis.

In certain embodiments, after conversion of the sampled acoustic energy to digital form, the digitized samples are band-pass filtered (by one or more digital filters or time-to-frequency transformation and selection of resulting data with the desired band or bands). Then the band-limited data is correlated with stored versions of the pulses (or single pulse) to be detected. One simplified form of correlation analysis converts the band-limited data to binary amplitude values (e.g., by comparison to a threshold) and correlates the binary amplitude values with stored binary versions of the pulse or pulses to be detected.

Figure 8:
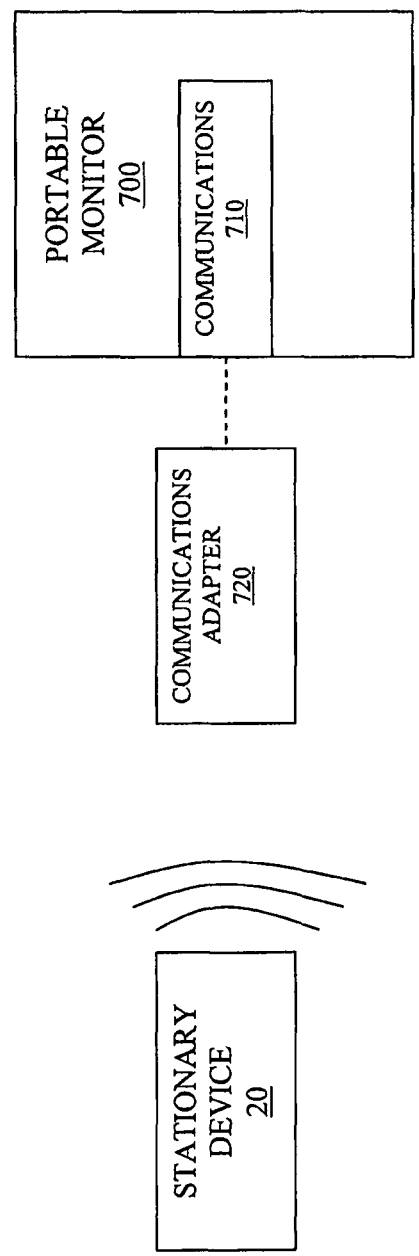
FIG. 8 Illustrates certain embodiments in which a portable monitor is coupled with a communication adapter enabling the portable monitor to receive location data from a stationary monitor.

Certain embodiments employ ultrasonic acoustic location codes emitted from the stationary device 20 containing data to be received by the portable monitor 30. FIG. 8 illustrates a portable monitor 700 adapted to be carried on the person of an audience member and operative to pick up acoustic codes in the audible frequency range, such as ancillary codes included in broadcasts reproduced acoustically by a presentation device. Portable monitor 700 comprises communications 710 for receiving data communications in the form of RF, infrared, acoustic, magnetic and/or electric field signals, but which is not capable of receiving the ultrasonic location codes from stationary device 20.

A communications adapter 720 accompanies portable monitor 700 as it is carried on the person of a panelist. In certain embodiments, communications adapter 720 is carried in or on an enclosure of portable monitor 700 (such as in the form of an adhesively affixed device or incorporated in a cover for the portable monitor 700, such as a "skin"). In certain embodiments, communications adapter 720 is carried on or by a device used by the panelist to carry portable monitor 700, such as a lanyard. In certain embodiments, communications adapter is carried on the person of the panelist who also carries the portable monitor 700.

Figure 9:
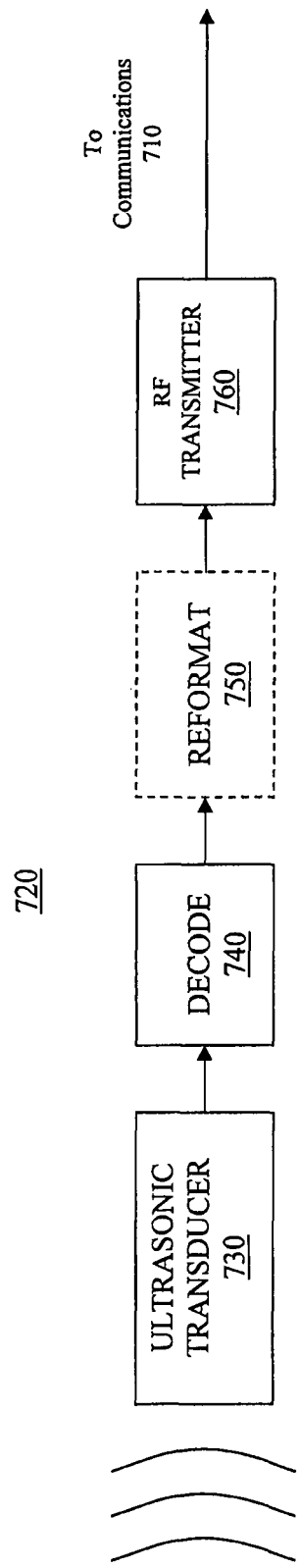
FIG. 9 illustrates certain embodiments of the communications adapter of FIG. 8.

FIG. 9 illustrates an embodiment of communications adapter 720 for use with a portable monitor 700 in which communications 710 comprises an RF receiver. Communications adapter 720 serves to receive ultrasonic codes from stationary device 20 with an ultrasonic transducer 730, to decode 740 the received codes to recover location data encoded thereby, to reformat 750 the location data to a form that can be processed by portable monitor 700 and to communicate the reformatted location data to communications 710 of portable monitor 700 by RF using an RF transmitter 760. In certain ones of such embodiments, the ultrasonic transducer 730 receives a 40 kHz ultrasonic location code from stationary device 20. The received codes are decoded 740 by downconverting the ultrasonic codes to 256 Hz data. If necessary, the decoded data is further decoded and/or reformatted 750 and supplied to modulate an RF carrier for transmission to communications 710 of portable monitor 700.

In certain embodiments of communications adapter 720, the output of ultrasonic transducer 730 is not decoded, but rather modulates a carrier in RF transmitter 760, or an infrared carrier used to drive an infrared emitter to be received by a light detector of communications 710 (not shown for purposes of simplicity and clarity). In certain embodiments, communications adapter 720 stores decoded and/or reformatted location data in storage (not shown for purposes of simplicity and clarity), and subsequently reads the stored codes from the storage and communicates them to communications 710. In certain embodiments, RF transmitter 760 is replaced by an acoustic transducer, an infrared light emitter, a magnetic or electric field producing device, or other wired or wireless data communication device compatible with communications 710 to communicate data from communications adapter 720 to communications 710.

FIG. 10 illustrates an embodiment in which a portable monitor 800 is carried on the person of a panelist in the same room as stationary device 20. Portable monitor 800 serves to receive ancillary codes encoding a selected channel, station, or other source of content, content identification or other characterizing data at a first receiver 810, and to receive a location code from stationary device 20 at a second receiver 820. Data received by the first and second receivers 810 and 820 is supplied to processing and storage 830 to be read and stored for subsequent communication to a processing facility by communications 840. In certain embodiments, the first receiver 810 comprises an acoustic transducer that receives ambient acoustic energy and supplies it to processing and storage 830 where it is processed to read any ancillary codes present in the ambient acoustic energy. Any such ancillary codes that can be read are stored with a time stamp. In certain embodiments, the second receiver 820 comprises an ultrasonic transducer, an infrared detector and/or an RF receiver to receive location codes from, stationary monitor 20 which the second receiver 820 supplies to processing and storage 830 where they are read. Any such location codes that can be read are stored with a time stamp.

Figure 10A:
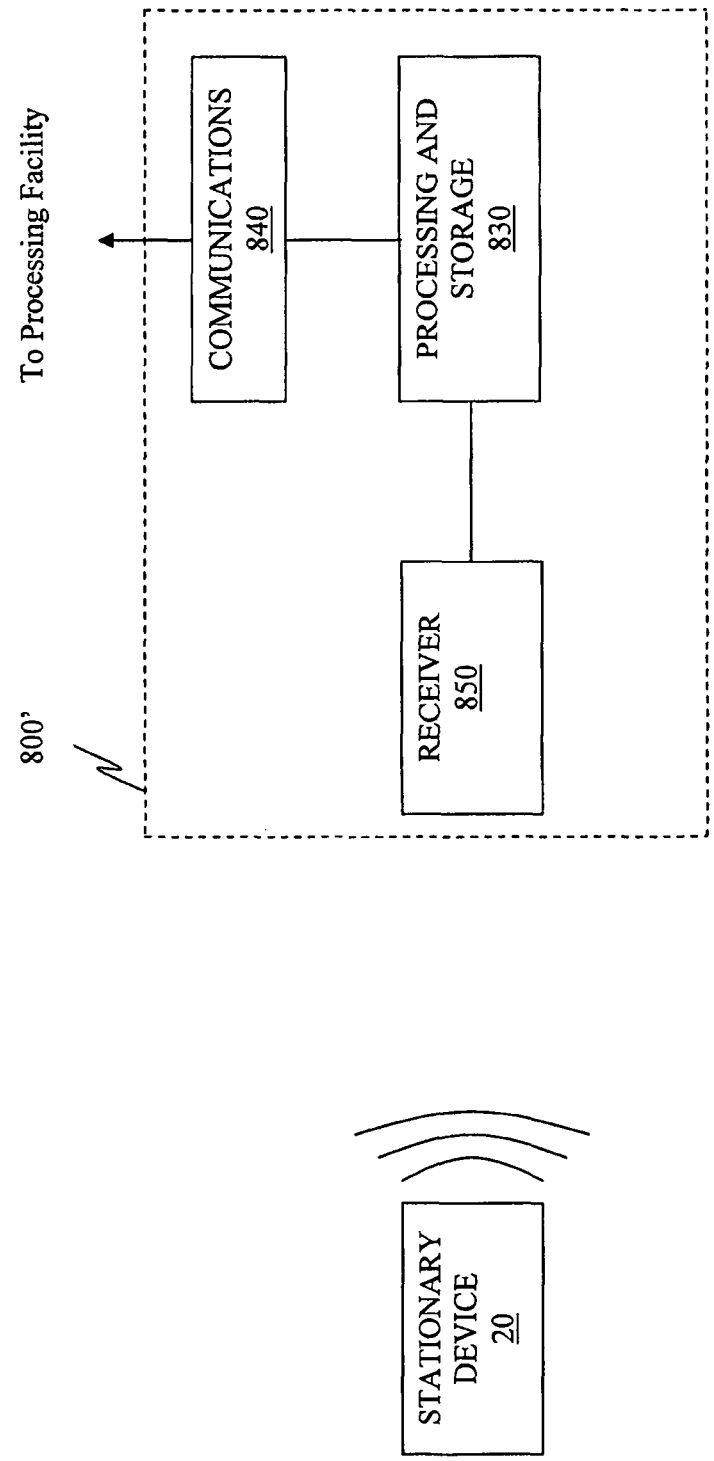
FIG. 10A illustrates a portable monitor having a single receiver for receiving ancillary codes and location codes.

FIG. 10A illustrates a modification of the portable monitor 800 according to further embodiments, indicated as 800' in FIG. 10A, which comprises a single receiver 850, in place of receivers 810 and 820 of the FIG. 10 embodiment. In certain ones of the embodiments of FIG. 10A, the receiver 850 receives both ancillary codes and location codes from stationary monitor 20 which transmits the codes either as acoustic energy (whether in the audible frequency range or as ultrasonic frequencies), RF energy or infrared energy, in a way that processing and storage 830 can distinguish the location codes and ancillary codes. In certain ones of such embodiments, the ancillary codes and location codes are communicated by stationary monitor 20 as separate message layers according to a technique disclosed in U.S. Pat. No. 6,845,360 to Jensen, et al. assigned to the assignee of the present application and hereby incorporated herein by reference. The separate message layers are both received by receiver 850 which comprises an acoustic transducer. In certain ones of such embodiments, the ancillary codes and location codes are both communicated as acoustic energy to receiver 850, in the audible frequency range, at ultrasonic frequencies or both, but in separate frequency bands. In certain ones of such embodiments, the ancillary codes and location codes are both communicated from stationary monitor 20 as infrared codes to receiver 850 comprising an infrared light detector, whether as time division multiplexed data or in any other known manner that enables receiver 850 and/or processing and storage 830 to distinguish the codes. In certain ones of such embodiments, the ancillary codes and locations codes are both communicated from stationary monitor 20 as short-range and/or directional RF energy to receiver 850 comprising an RF receiver in any known manner that enables receiver 850 and/or processing and storage 830 to distinguish the codes, for example, as time-division multiplexed signals, code-division multiplexed signals or otherwise. In certain embodiments, the stationary device 20 communicates the location codes to receiver 850 and a separate device communicates the ancillary codes to receiver 850, for example, a presentation device (such as a television, radio or the like) may communicate the ancillary codes to the receiver 850 as audible-range acoustic data.

At the processing facility, the ancillary codes and location codes received from the portable monitor 800 and/or the portable monitor 800', along with their time stamps, are processed to produce a database of content exposure data for the corresponding panelist (identified by panelist ID or portable monitor ID), indicating the content that the panelist was exposed to and/or the content source, the times and days of exposure and the particular location of the panelist when exposed to such content. In certain embodiments, the content exposure data for a given panelist/portable monitor are matched with data collected by stationary devices acting as monitors in respective locations or other stationary monitoring devices at such locations, to supplement the content exposure data for that panelist/portable monitor. These latter embodiments are useful, for example, where the stationary monitoring devices are able to gather content presentation records having a greater time resolution than those obtainable from the portable monitor 800.

A method of producing data representing exposure of a panelist to content at a predetermined location comprises supplying the panelist with a portable monitor capable of being carried on the person of the panelist, gathering content exposure data in the portable monitor as it is carried on the person of the panelist, gathering location data in the portable monitor as it is carried on the person of the panelist, the location data indicating a presence of the panelist at the predetermined location and processing the gathered content exposure data and the gathered location data to produce data representing content to which the panelist was exposed when the panelist was present at the predetermined location.

FIG. 11 illustrates an embodiment of a system for gathering data concerning exposure of a panelist to content, wherein the panelist is provided with two separate devices for gathering such data. More specifically, the panelist is provided with a first portable device 900 that serves to receive ancillary codes encoding a selected channel, station, or other source of content, content identification or other characterizing data relating to content, and a second portable device 910 that serves to receive a location code from stationary device 20. Each of the portable deices 900 and 910 is carried on the person of the panelist to receive its respective data, and each stores its respective data with a time stamp.

In certain embodiments, each of the portable devices 900 and 910 communicates its stored data to a processing facility separately from the data communicated from the other device. At the processing facility, the ancillary codes received from the first portable device 900, along with their time stamps, are processed to produce a database of content exposure data for the corresponding panelist (identified by panelist ID or portable monitor ID), indicating the content that the panelist was exposed to and/or the content source, and the times and days of exposure. Also at the processing facility, the location codes received from the second portable device 910, along with their time stamps are processed to produce a database of location data, and corresponding time/date data, for the panelist (identified by panelist ID or portable monitor ID). The database of content exposure data and the database of location data are both used to produce reports in the form of still further databases for indicating the content that the panelist was exposed to and/or the content source, along with times, dates and locations of such exposure. Such further databases take the form of data used to provide reports as visual displays to a user, printed reports or other forms, and/or are processed with still further data, to provide still further such reports.

Figure 11A:
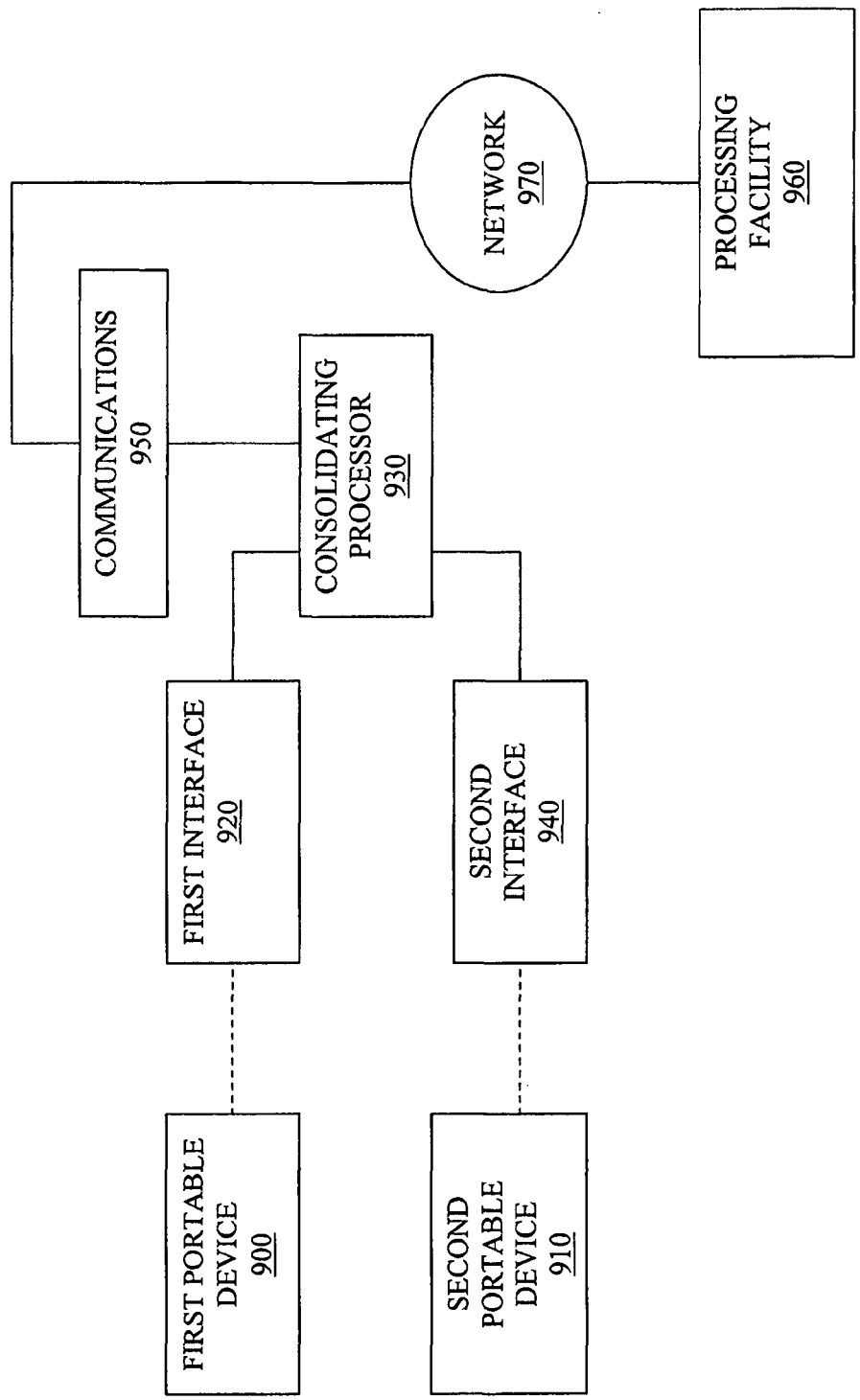
FIG. 11A illustrates a system for consolidating and communicating the data gathered by the portable devices of FIG. 11.

In certain embodiments, the data gathered by the first and second portable devices 900 and 910 are combined in the panelist's household and then communicated therefrom to the processing facility. FIG. 11A is a functional block diagram of such a data gathering and communicating system in which the first portable device 900 assigned to the panelist communicates its data via a first interface 920 to a data consolidating processor 930 within the panelist's household and second portable device assigned to the panelist communicates its data to the data consolidating processor 930 via a second interface 940. The data consolidating processor 930 combines the data from the first and second portable devices 900 and 910 in a single database which it supplies to communications 950 which serves to communicate the consolidated data from the first and second devices to the processing facility, indicated as 960 in FIG. 11A, via a network 970.

In certain embodiments, one of the first and second devices portable 900 and 910 communicates the data it has gathered, including time stamp data, to the other of the first and second device 900 and 910 either by a wired connection or a wireless link, such as a Bluetooth or Zigbee link. The one of the first and second portable devices 900 and 910 that receives such data from the other thereof, communicates its data to the processing facility 960 via the network 970, either through an interface in the panelist's household, or by a direct link to the network 970 (such as a cellular telephone link or an Internet gateway).

A method of producing data representing exposure of a panelist to content at a predetermined location comprises supplying the panelist with a first portable device capable of being carried on the person of the panelist, gathering content exposure data in the first portable device as it is carried on the person of the panelist, providing the panelist with a second portable device capable of being carried on the person of the panelist, gathering location data in the second portable device as it is carried on the person of the panelist, the location data indicating a presence of the panelist at the predetermined location and processing the gathered content exposure data and the gathered location data to produce data representing content to which the panelist was exposed when the panelist was present at the predetermined location.

Figure 12:
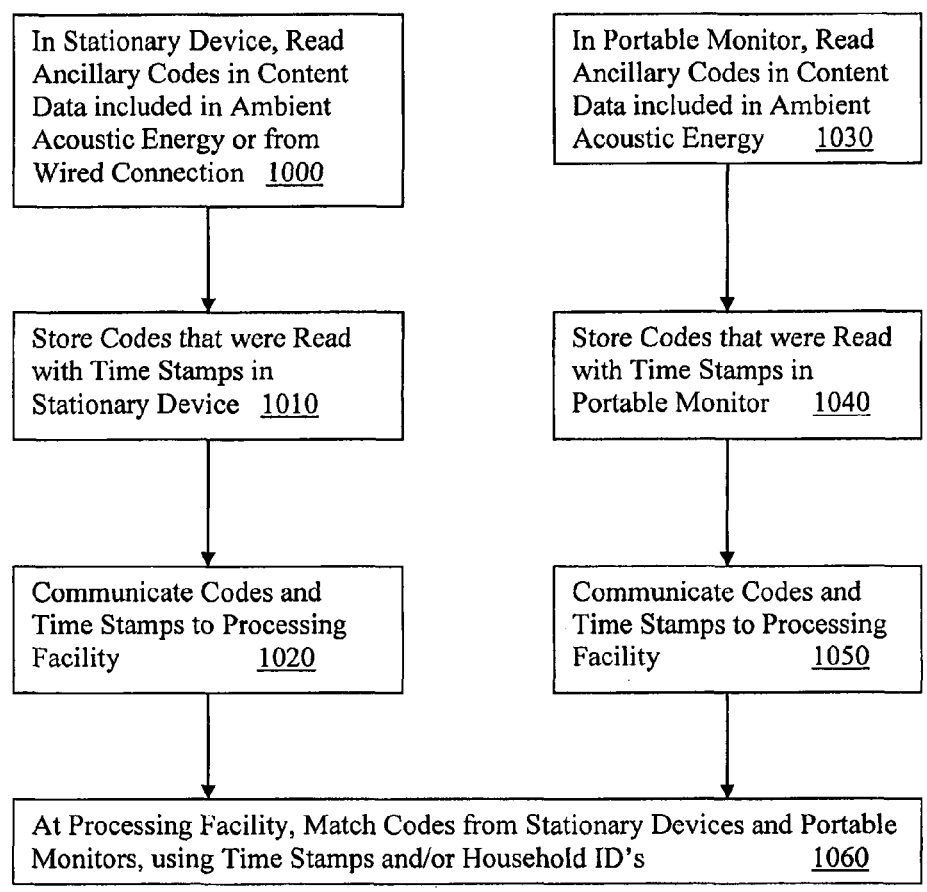
FIG. 12 illustrates a code reading and matching process for determining whether a panelist is in an area proximate to a stationary monitor.

FIG. 12 illustrates a process for determining a location of a panelist carrying portable monitor 30 of FIG. 1 proximate to presentation 15 which is reproducing content acoustically. It will be appreciated that the use of stationary device 20 to communicate location codes to monitor 30 is not required in the embodiment of FIG. 12.

As indicated in FIG. 12, stationary device 20 reads 1000 ancillary codes in acoustic content data reproduced by presentation 15 and thus included in the ambient acoustic energy. In the alternative, stationary device 20 has a wired connection to presentation device 15 or another source of the audio reproduced thereby to read such ancillary codes. Stationary device 20 stores 1010 the codes it has read with time stamps and subsequently communicates 1020 the stored codes and their time stamps to a processing facility.

At the same time that stationary monitor 20 is reading ancillary codes from data that has been, or is being reproduced by presentation 15, the portable monitor 30 reads 1030 the same ancillary codes in the acoustic content data reproduced by presentation 15. Portable monitor 30 stores 1040 the codes it has read with time stamps and subsequently communicates 1050 the stored codes and their time stamps to the processing facility.

The processing facility processes 1060 the ancillary codes and associated time stamps from stationary device 20 and portable monitor 30 to determine if the ancillary codes with corresponding time stamps match. If so, processing facility records data indicating such match and/or an inference that the panelist assigned to carry portable monitor 30 was present in the same area (e.g., room of the panelist's household) as stationary device 20 at the times reflected by the time stamps. The matching process can be substantially simplified using data correlating stationary device 20 with the panelist's household and corresponding data for the portable monitor 30.

In certain embodiments, code detection data is produced indicating that either an ancillary code was or was not detected at each of a plurality of times or time periods both by stationary device 20 and portable monitor 30. Such code detection data is produced by either or both of stationary device 20 and portable monitor 30, and/or at the processing facility. The code detection data for the monitor 30 and stationary device 20 is compared at corresponding times for a match of all or a sufficiently large number or proportion of the code detection data to determine a proximity of the monitor 30 and stationary device 20 at such corresponding times.

In certain embodiments, only portions of ancillary codes read by portable monitor 30 and stationary device 20 at corresponding times or time periods are compared to determine a proximity of the portable monitor 30 and stationary device 20. In certain ones of such embodiments, only marker symbols detected by the monitor 30 and device 20 are compared for this purpose.

Figure 13:
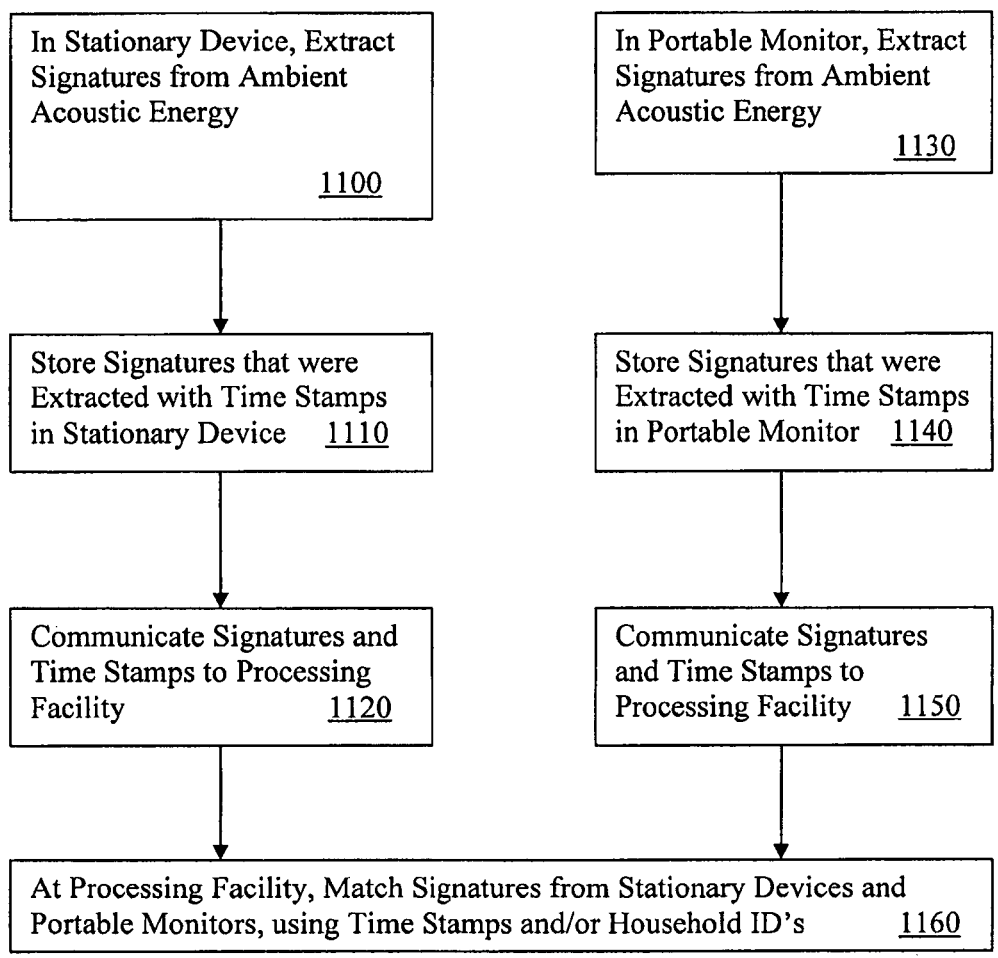
FIG. 13 illustrates a signature extracting and matching process for determining whether a panelist is in an area proximate to a stationary monitor.

FIG. 13 illustrates a further process for determining a location of a panelist carrying portable monitor 30 of FIG. 1 proximate to presentation which is reproducing content acoustically. As in the embodiment of FIG. 12, it will be appreciated that the use of stationary device 20 to communicate location codes to monitor 30 is not required in the embodiment of FIG. 13.

As indicated in FIG. 13, stationary device 20 extracts 1100 signatures from the ambient acoustic energy. In the alternative, stationary device has a wired connection to presentation device 15 or another source of the audio reproduced thereby to receive the audio data being reproduced and extracts signatures therefrom. Stationary device 20 stores 1110 the signatures it has extracted with time stamps and subsequently communicates 1120 the stored signatures and their time stamps to a processing facility.

At the same time that stationary monitor 20 is extracting signatures from data that has been, or is being reproduced by presentation 15, the portable monitor 30 extracts 1130 signatures from the ambient acoustic energy, including the acoustic content data reproduced by presentation 15. Portable monitor 30 stores 1140 the extracted signatures with time stamps and subsequently communicates 1150 the stored signatures and their time stamps to the processing facility.

The processing facility processes 1160 the signatures and associated time stamps from stationary device 20 and portable monitor 30 to determine if they match. If so, the processing facility records data indicating such match and/or an inference that the panelist assigned to carry portable monitor 30 was present in the same area (e.g., room of the panelist's household) as stationary device 20 at the times reflected by the time stamps. The matching process can be substantially simplified using data correlating stationary device with the panelist's household and corresponding data for the portable monitor 30.

Suitable techniques for extracting signatures include those disclosed in U.S. Pat. No. 5,612,729 to Ellis, et al. and in U.S. Pat. No. 4,739,398 to Thomas, et al., each of which is assigned to the assignee of the present application and both of which are incorporated herein by reference in their entireties.

Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel and PCT publication WO91/11062 to Young, et al., all of which are incorporated herein by reference in their entireties.

An advantageous signature extraction technique transforms audio data within a predetermined frequency range to the frequency domain by a transform function, such as an FFT. The FFT data from an even number of frequency bands (for example, eight, ten, sixteen or thirty two frequency bands) spanning the predetermined frequency range are used two bands at a time during successive time intervals. FIG. 14 provides an example of how pairs of the bands are selected during successive time intervals where the total number of bands used is equal to ten. The selected bands are indicated by an "X".

When each band is selected, the energy values of the FFT bins within such band and such time interval are processed to form one bit of the signature. If there are ten FFT's for each interval of the audio signal, for example, the values of all bins of such band within the first five FFT's are summed to form a value "A" and the values of all bins of such band within the last five FFT's are summed to form a value "B". In the case of a received broadcast audio signal, the value A is formed from portions of the audio signal that were broadcast prior to those used to form the value B.

To form a bit of the signature, the values A and B are compared. If B is greater than A, the bit is assigned a value "1" and if A is greater than or equal to B, the bit is assigned a value of "0". Thus, during each time interval, two bits of the signature are produced.

In certain embodiments, both portable monitor 30 and stationary device 20 process data representing ambient acoustic energy at corresponding times or time periods to produce ambient acoustic energy change data representing one or more of energy changes in one or more frequency bands or intervals, with or without comparison to other time periods or intervals of the same or other frequency bands or intervals. In certain ones of such embodiments, acoustic energy or power transitions over time greater than a predetermined value (such as 20 db, 30 db, or other) are stored. Such comparisons can be made, for example, to average energy or power levels for one or more time periods or intervals and/or frequency intervals or bands.

In certain embodiments, data is produced by portable monitor 30 and stationary device 20 produce energy or power trend data indicating changes in ambient acoustic power or energy over time in one or more frequency bands or intervals. In each such embodiment and variants thereof, the data representing ambient acoustic energy changes gathered by device 20 and monitor 30 are compared to determine if the same were in proximity at one or more times, time periods or intervals.

Although various embodiments have been described with reference to a particular arrangement of parts, features and the like, these are not intended to exhaust all possible arrangements or features, and indeed many other embodiments, modifications and variations will be ascertainable to those of skill in the art.

What is claimed is:

1. A method for gathering data concerning exposure to media-data, comprising:
    gathering, via a stationary monitoring system, first data concerning exposure to the media output by a media receiver wherein gathering the first data comprises collecting a first ancillary code encoded in the media;
    gathering second data concerning exposure to the media output by the media receiver with a portable monitor carried on the person of a user, wherein the second data comprises a second ancillary code encoded in the media;
    gathering location data encoded in the media by the stationary monitoring system, the location data providing information on a physical location of the portable monitor relative to the stationary monitoring system; and
    producing audience measurement data concerning exposure to the media output by the receiver from the first data, the second data, and the location data.

2. The method of claim 1, wherein the media receiver comprises the stationary monitoring system.

3. The method of claim 2, wherein the stationary monitoring system comprises software running on a processor of the media receiver.

4. The method of claim 3, wherein the media receiver comprises at least one of a media recording device, a media playback device, a user-operated recording device, a user-operated playback device, a television, television broadcast reception equipment, a radio, radio broadcast reception equipment, a video cassette player, a digital video disk player, a digital video recorder, a gaming device, a personal video player, an audio cassette player, a compact disk player, a personal audio player, an electronic book, and a personal computer.

5. The method of claim 1, wherein the media comprises at least one of television data, radio data, video cassette data, digital video disk data, digital video recorder data, personal video player data, audio cassette data, compact disk data, personal audio player data, audio data, video data, digital audio data, digital video data, gaming data, streaming media, Internet-supplied data, and personal computer data.

6. The method of claim 1, wherein gathering the first data comprises gathering first media data reception data comprising an indication of at least one of a station, a channel, and a program received by the media receiver, wherein gathering the second data comprises gathering second media reception data comprising an indication of at least one of a station, a channel, and a program to which the user was exposed.

7. The method of claim 1, further comprising gathering at least one of portable monitor identification data, audience member identification data and audience member demographic data, and producing audience measurement data concerning exposure to the media output by at least one of portable monitor identification data, audience member identification data and audience member demographic data.

8. A system for gathering data concerning exposure to media, comprising:
    a stationary monitoring system for gathering first data concerning exposure to the media from a media receiver, wherein gathering the first data comprises gathering a first ancillary code encoded in the media;
    a portable monitor for gathering second data concerning exposure to the media output by the media receiver, wherein gathering the second data comprises gathering a second ancillary code encoded in the media;
    wherein the portable monitor gathers location data encoded in the media by the stationary monitoring system, the location data providing information on a physical location of the portable monitor relative to the stationary monitoring system; and
    a processor comprising at least one input for receiving the first data, second, data, and location data and producing audience measurement data concerning exposure to the media output by the media receiver based on the first data, the second data, and the location data.

9. The system of claim 8, wherein the media receiver comprises the stationary monitoring system.

10. The system of claim 9, wherein the stationary monitoring system comprises software running on a processor of the media receiver.

11. The system of claim 10, wherein the media receiver comprises at least one of a media recording device, a media playback device, a user-operated recording device, a user-operated playback device, a television, television broadcast reception equipment, a radio, radio broadcast reception equipment, a video cassette player, a digital video disk player, a digital video recorder, a gaming device, a personal video player, an audio cassette player, a compact disk player, a personal audio player, an electronic book, and a personal computer.

12. The system of claim 8, wherein the media comprises at least one of television data, radio data, video cassette data, digital video disk data, digital video recorder data, personal video player data, audio cassette data, compact disk data, personal audio player data, audio data, video data, digital audio data, digital video data, gaming data, streaming media, Internet-supplied data, and personal computer data.

13. The system of claim 8, wherein the first data comprises first media reception data comprising an indication of at least one of a station, a channel, and a program received by the media receiver, the second data comprises second media reception data comprising an indication of at least one of a station, a channel, and a program to which a user was exposed.

14. The system of claim 8, further comprising gathering at least one of portable monitor identification data, audience member identification data and audience member demographic data, and producing audience measurement data concerning usage of the media output by at least one of portable monitor identification data, audience member identification data and audience member demographic data.

15. A method for gathering data concerning exposure to media related to a content presentation, comprising:
 gathering, via a stationary monitoring system, first data concerning exposure to the media output by a media receiver, wherein gathering the first data comprises the stationary monitoring system detecting a first ancillary code encoded in the media;
 gathering, via a portable monitor carried on the person of a user, second data concerning exposure to the media output by the media receiver, wherein gathering the second data comprises the portable monitor detecting a second ancillary code encoded in the media;
 gathering, via the portable monitor, location data encoded in the media by the stationary monitoring system;
 comparing the first and second data to produce presence data indicating a presence of an audience member at the media receiver; and
 producing audience measurement data concerning exposure to the media output by the media receiver from the first data, the second data, the location data, and the presence data.

16. The method of claim 15, wherein the media receiver comprises the stationary monitoring system.

17. The method of claim 16, wherein the media receiver comprises at least one of a media recording device, a media playback device, a user-operated recording device, a user-operated playback device, a television, television broadcast reception equipment, a radio, radio broadcast reception equipment, a video cassette player, a digital video disk player, a digital video recorder, a gaming device, a personal video player, an audio cassette player, a compact disk player, a personal audio player, an electronic book, and a personal computer.

18. The method of claim 15, wherein the media comprises at least one of television data, radio data, video cassette data, digital video disk data, digital video recorder data, personal video player data, audio cassette data, compact disk data, personal audio player data, audio data, video data, digital audio data, digital video data, gaming data, streaming media, Internet-supplied data, and personal computer data.

19. The method of claim 15, wherein gathering the first data comprises gathering first media reception data comprising an indication of at least one of a station, a channel, and a program received by the media receiver, wherein gathering the second data comprises gathering second media reception data comprising an indication of at least one of a station, a channel, and a program to which the user was exposed.

20. The method of claim 15, further comprising gathering at least one of portable monitor identification data, audience member identification data and audience member demographic data, and producing audience measurement data concerning exposure to the media output by at least one of portable monitor identification data, audience member identification data and audience member demographic data.

21. A method for gathering data concerning exposure to media, comprising:
 gathering, via a stationary monitoring system, first data concerning exposure to the media output by a media receiver, wherein gathering the first data comprises at least one of (i) gathering a detected first ancillary code encoded in the media, and (ii) gathering a signature extracted from the media;
 gathering, via a portable monitor carried on the person of the user, second data concerning exposure to the media output by the media receiver, wherein the second data comprises encoded location data encoded in the media by the stationary monitoring system and at least one of (i) a detected first ancillary code encoded in the media, and (ii) a signature extracted from the media;
 comparing the first gathered data to the second gathered data; and
 producing audience measurement data associated with the media based on the location data and the comparison of the first gathered data to the second gathered data, the location data encoded in the media by the stationary monitoring system and gathered by the portable monitor, wherein the location data provides information on a physical location of the portable monitor relative to the stationary monitoring system.

* * * * *

UNITED STATES PATENT AND TRADEMARK OFFICE
CERTIFICATE OF CORRECTION

| | |
|---|---|
| PATENT NO. | : 8,738,763 B2 |
| APPLICATION NO. | : 11/935788 |
| DATED | : May 27, 2014 |
| INVENTOR(S) | : Jack C. Crystal et al. |

It is certified that error appears in the above-identified patent and that said Letters Patent is hereby corrected as shown below:

In the Claims:

Claim 1, Column 17, line 57:
replace "media-data" with --media--.

Claim 6, Column 18, line 30:
replace "media data" with --media--.

Signed and Sealed this
Twenty-fourth Day of February, 2015

Michelle K. Lee
*Deputy Director of the United States Patent and Trademark Office*